United States Patent
Funato et al.

(10) Patent No.: US 7,689,225 B2
(45) Date of Patent: *Mar. 30, 2010

(54) METHOD AND APPARATUS FOR DORMANT MODE SUPPORT WITH PAGING

(75) Inventors: Daichi Funato, Mountain View, CA (US); Fujio Watanabe, San Jose, CA (US); Toshio Miki, Cupertino, CA (US)

(73) Assignee: NTT DoCoMo, Inc., Tokyo (JP)

(*) Notice: Subject to any disclaimer, the term of this patent is extended or adjusted under 35 U.S.C. 154(b) by 1483 days.

This patent is subject to a terminal disclaimer.

(21) Appl. No.: 10/264,807

(22) Filed: Oct. 4, 2002

(65) Prior Publication Data

US 2003/0145092 A1 Jul. 31, 2003

Related U.S. Application Data

(60) Provisional application No. 60/352,423, filed on Jan. 28, 2002.

(51) Int. Cl.
*H04W 72/00* (2006.01)
(52) U.S. Cl. .................. 455/450; 455/464; 455/509; 370/329
(58) Field of Classification Search .............. 455/450, 455/451, 452.1, 464, 509, 547, 343.1; 370/329, 370/341, 431
See application file for complete search history.

(56) References Cited

U.S. PATENT DOCUMENTS

| | | | |
|---|---|---|---|
| 4,679,244 A | | 7/1987 | Kawasaki et al. |
| 5,077,834 A | * | 12/1991 | Andros et al. ............ 455/193.1 |
| 5,109,530 A | | 4/1992 | Stengel |
| 5,237,603 A | * | 8/1993 | Yamagata et al. .......... 455/464 |
| 5,241,568 A | | 8/1993 | Fernandez et al. |

(Continued)

FOREIGN PATENT DOCUMENTS

EP 1 124 399 A1 8/2001

(Continued)

OTHER PUBLICATIONS

WO99/48320 Sinivaara, Cell handover method and cellular radio system.*

(Continued)

*Primary Examiner*—Nghi H Ly
(74) *Attorney, Agent, or Firm*—Blakely, Sokoloff, Taylor & Zafman LLP

(57) ABSTRACT

Apparatuses and methods are disclosed herein for implementing dormant mode with paging in a WLAN. Power savings in the computing device and reduction in traffic across the network are achieved by requiring a computing device to inform the WLAN of its location only when it crosses a paging area boundary or is to receive IP traffic. Dormant mode with paging is implemented in a protocol that supports dormant functionality and paging functionality but does not itself provide methods or standards for implementing such functionality, such as the IEEE 802.11. The methods and apparatuses disclosed herein provide the methods needed to implement dormant mode with paging in such a protocol. Generally, the methods and apparatuses for implementing dormant mode with paging basically include (1) establishing paging areas; (2) communicating access group information to a computing device; and (3) locating a computing device.

17 Claims, 18 Drawing Sheets

U.S. PATENT DOCUMENTS

| | | | |
|---|---|---|---|
| 5,613,204 | A | 3/1997 | Haberman et al. |
| 5,734,984 | A | 3/1998 | Reece et al. |
| 5,778,075 | A | 7/1998 | Haartsen |
| 5,835,860 | A | 11/1998 | Diachina |
| 5,920,557 | A | 7/1999 | Hirata |
| 5,940,771 | A | 8/1999 | Gollnick et al. |
| 5,945,948 | A | 8/1999 | Buford et al. |
| 6,065,058 | A | 5/2000 | Hailpern et al. |
| 6,085,193 | A | 7/2000 | Malkin et al. |
| 6,088,591 | A | 7/2000 | Trompower et al. |
| 6,195,046 | B1* | 2/2001 | Gilhousen .................. 342/457 |
| 6,201,803 | B1* | 3/2001 | Munday et al. ............. 370/350 |
| 6,246,875 | B1* | 6/2001 | Seazholtz et al. ........ 455/432.1 |
| 6,259,898 | B1 | 7/2001 | Lewis |
| 6,345,043 | B1 | 2/2002 | Hsu |
| 6,351,468 | B1 | 2/2002 | LaRowe, Jr. et al. |
| 6,421,716 | B1 | 7/2002 | Eldridge et al. |
| 6,519,248 | B1* | 2/2003 | Valko .......................... 370/352 |
| 6,522,670 | B1* | 2/2003 | Jokinen et al. .............. 370/503 |
| 6,594,493 | B1 | 7/2003 | Davies et al. |
| 6,650,630 | B1* | 11/2003 | Haartsen ..................... 370/345 |
| 6,659,947 | B1* | 12/2003 | Carter et al. ................. 600/300 |
| 6,717,926 | B1* | 4/2004 | Deboille et al. ............ 370/330 |
| 6,788,668 | B1* | 9/2004 | Shah et al. .................. 370/342 |
| 6,868,272 | B1* | 3/2005 | Berkowitz et al. .......... 455/445 |
| 6,914,906 | B1* | 7/2005 | Mullens et al. ............. 370/397 |
| 6,920,171 | B2 | 7/2005 | Souissi et al. |
| 6,968,219 | B2* | 11/2005 | Pattabiraman et al. ...... 455/574 |
| 6,975,613 | B1 | 12/2005 | Johansson |
| 6,980,660 | B1 | 12/2005 | Hind et al. |
| 6,985,750 | B1 | 1/2006 | Vicknair et al. |
| 7,003,297 | B2* | 2/2006 | Willars et al. ............... 455/436 |
| 7,016,326 | B2* | 3/2006 | Holcman et al. ............ 370/331 |
| 7,039,027 | B2* | 5/2006 | Bridgelall ................... 370/329 |
| 7,313,628 | B2 | 12/2007 | Chaskar et al. |
| 7,417,971 | B2* | 8/2008 | Jeong et al. ................. 370/331 |
| 7,480,307 | B2 | 1/2009 | Chaskar et al. |
| 2001/0004594 | A1 | 6/2001 | Kuroiwa |
| 2001/0024953 | A1 | 9/2001 | Balogh |
| 2001/0032262 | A1 | 10/2001 | Sundqvist et al. |
| 2001/0049282 | A1 | 12/2001 | Ushiki et al. |
| 2002/0023164 | A1 | 2/2002 | Lahr |
| 2002/0026592 | A1 | 2/2002 | Gavrila et al. |
| 2002/0152288 | A1 | 10/2002 | Hora et al. |
| 2003/0018623 | A1 | 1/2003 | Aggarwal et al. |
| 2003/0134642 | A1 | 7/2003 | Kostic et al. |
| 2003/0145092 | A1 | 7/2003 | Funato et al. |
| 2008/0240323 | A1* | 10/2008 | Funato et al. ............... 375/362 |

FOREIGN PATENT DOCUMENTS

| | | |
|---|---|---|
| EP | 1124399 A1 | 8/2001 |
| JP | 10271553 A | 10/1998 |
| WO | WO 99/48320 | 9/1999 |
| WO | WO 01/80461 A1 | 10/2001 |

OTHER PUBLICATIONS

PCT-International Search Report, May 13, 2003.

Plamen Nedeltchev, Ph.D., *Wireless LAN Ready for Prime Time*, 13 No. 3 Packet™ Magazine, copyright © 2001 by Cisco System, Inc., 91 (2001).

"R. Ramjee, L. Li, T. La Porta, and S. Kasera "IP Paging Service for Mobile Hosts, ACM Sigmobile 7/01 Rome, Italy (2001).

B. Aboba, T. Moore "A Model for Context Transfer in IEEE 802," Internet Draft <draft-aboba-802-context-01.tx>, 1-16 (Apr. 6, 2006). Downloaded from http://wwwpotaroo.net/ietf/ids/draft-aboba-802-context-02.txt (Oct. 4, 2002).

J. Kempf, "Dormant Mode Host Alerting ("IP Paging") Problem Statement", Internet Society 1-11 (2001) Downloaded from http://www.faqs.org/rfc3132.html (Mar. 27, 2002).

Fabio M. Chiussi, et al. A Network Architecture for MPLS-Based Micro-Mobility, Bell Laboratories, Lucent Technology, N.J., USA. (2002) IEEE.

Mills, D. L., "Network Time Protocol (Version 3) Specification, Implementation and Analysis", RFC 1305, Mar. 1992.

Guttman, E., et al., "Service Location Protocol, Version 2", RFC 2608, Jun. 1999.

Sarikaya, B., et al., "Tracking agent based pages for wireless LANs", Consumer Communications and Networking Conference (CCNC), 2004, First IEEE Las Vegas, NV, USA, Jan. 5-8, 2004, Piscataway, NJ, USA, IEEE, Jan. 5, 2004, pp. 279-284, XP010696838.

PCT International Search Report, PCT/US2006/023049, mailed Oct. 24, 2006, 4 pages.

PCT Written Opinion, PCT/US2006/023049, mailed Oct. 24, 2006, 6 pages.

PCT/US2006/023049 International Preliminary Report on Patentability mailed Jan. 3, 2008 (1 page).

PCT/US2006/023049 Written Opinion mailed Jan. 3, 2008 (6 pages).

Office Action dated Sep. 26, 2008, for related U.S. Appl. No. 11/336,236, filed Jan. 19, 2006.

U.S. Office Action for related U.S. Appl. No. 11/336,236, dated Aug. 1, 2007, 5 pages.

U.S. Office Action for related U.S. Appl. No. 11/336,236, dated Nov. 2, 2007, 12 pages.

U.S. Office Action for related U.S. Appl. No. 11/336,236, dated May 2, 2008, 9 pages.

U.S. Office Action for related U.S. Appl. No. 11/336,236, dated Sep. 26, 2008, 9 pages.

U.S. Final Office Action for related U.S. Appl. No, 11/336,236, dated Mar. 19, 2009, 10 pages.

Japanese Office Action for related Japanese Patent Application No. 2003-564759, dated Nov. 16, 2007, 4 pages.

Chinese Office Action for related Chinese Patent Application No. 03801251.0, dated Jan. 13, 2006, 3 pages.

Chinese Office Action for related Chinese Patent Application No. 200680020333.4, dated Mar. 13, 2009, 3 pages.

U.S. Office Action for related U.S. Patent Application No. 12/133,265, dated Mar. 12, 2009, 19 pages.

Office Action dated Dec. 30, 2009, for related U.S. Appl. No. 12/133,273, filed Jun. 4, 2008.

Ohba, Yoshihiro, et al, "LH-DMHA— Last Hop DMHA (Dormant Mode Host Alterting) Protocol," Sep. 12, 2001.

* cited by examiner

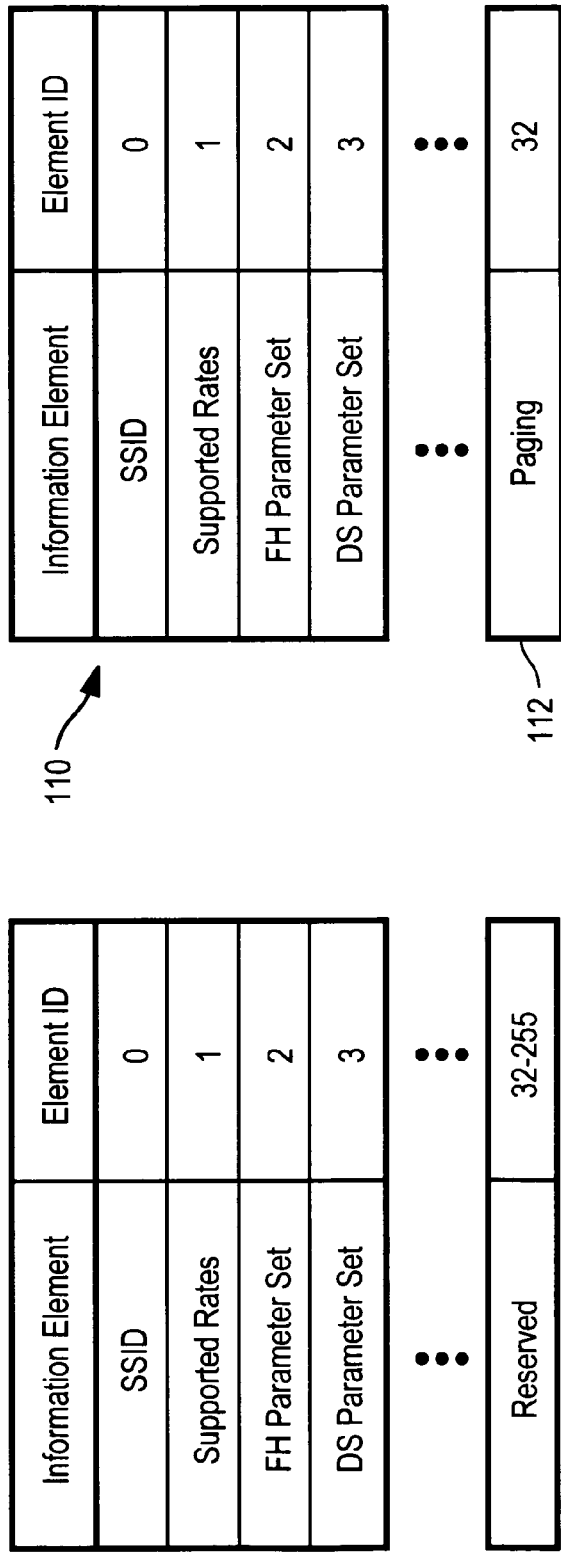
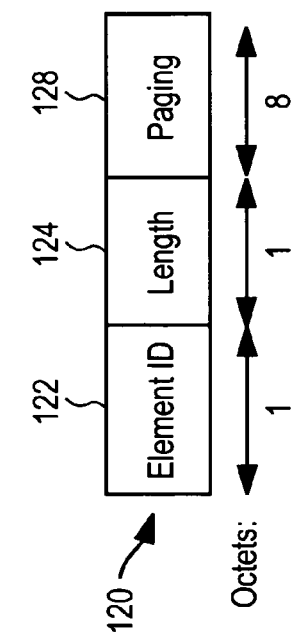
FIG. 12A (PRIOR ART)
FIG. 12B
FIG. 12C

METHOD AND APPARATUS FOR DORMANT MODE SUPPORT WITH PAGING

RELATED APPLICATIONS

This application claims priority based on the U.S. provisional patent application entitled "METHOD AND ASSOCIATED APPARATUS FOR DORMANT MODE SUPPORT WITH PAGING IN IEEE 802.11, " application Ser. No. 60/352,423, filed Jan. 28, 2002, which is incorporated by reference herein.

BACKGROUND

Local area networks ("LAN") have enabled digital networking of almost any computing device, including, computers, laptops, personal digital assistants, scanners and any other devices that deal with digital information. However, traditionally, the physical reach of LANs has been limited because they require a physical or hardwired connection between computing devices. Even with phone dial-ups, a LAN network is ultimately limited by its hard-wired nature. To overcome this limitation, wireless solutions were developed.

In a wireless LAN ("WLAN"), network connections are accomplished by use of a wireless technology such as radio frequency ("RF"), infra-red, microwave, millimeter wave or other type of wireless communication instead of cable. This allows a computing device to remain connected to the network while it is mobile or while it is not physically connected to the WLAN. The connection is usually accomplished and maintained through the use of an interface card installed in the computing device. WLANs may also include connections to a wired network, such as a LAN. Connections to the wired network are accomplished through the use of access points. Access points are connected to a node using some type of wired connection. An access point can reside at any node on the wired network and acts as a gateway for routing data ("IP traffic") between the wired and wireless portions of the network.

Several protocols have been proposed to standardize WLANs to allow greater compatibility with a wide range of devices, networks and components. One such protocol is the IEEE 802.11. The IEEE 802.11 protocol specifies both the architectures and layers of a WLAN. The IEEE 802.11 protocol specifies the physical and medium access control ("MAC") layers of a WLAN. The physical layer handles the wireless transmission of data, and is generally a form of RF or infrared communication. The MAC layer is a set of protocols which is responsible for maintaining order.

With regard to architecture, the IEEE 802.11 protocol specifies two types. The first, shown in FIG. 1, is the ad hoc network. The ad hoc network can be spontaneously created with a plurality of computing devices. As shown in FIG. 1, the ad hoc network has no structure, no fixed points and generally, every computing device can communicate with every other computing device. The second type of architecture is the infrastructure. As shown in FIG. 2, this architecture uses access points through which the computing devices can communicate with each other and a node of a wired network (hereinafter "node"). Computing devices communicate with an access point through some type of wireless technology and the access points communicate with a node through some type of wired technology. Nodes can communicate with each other through various types of networks, such as the Internet, generally by some type of wired connection. A distribution system, which is the mechanism by which the access points communicate with each other, is included in the access points, and also includes the Nodes, networks, and the connections among them. Each access point has a range over which it provides service. Each of these ranges is a basic service set ("BSS"); while the BSS and the distribution system form an extended service set ("ESS") which defines the range over which services can be provided. The location of the computing device on the network is determined by the access point to which it is connected.

A computing device can move about within the range of the access point to which it is connected. If the WLAN is designed so that there is some overlap of the ranges of the access points, it may be possible for a computing device to move among the access points and remain connected to the WLAN and continue to send and receive IP traffic. In order to do this, the WLAN needs to know where the computing device is so that it knows where to direct IP traffic intended for the computing device. In other words, the WLAN must track the computing device.

Generally, in order for the network to track the computing device, the computing device associates with an access point at a given time interval, upon its movement or when the computing device travels between or among the ranges of different access points. IP traffic intended for the computing device is forwarded to the last access point with which the computing device had associated and then forwards the IP traffic to the computing device. However, tracking and forwarding IP traffic to the computing device in this manner can lead to a power drain on the computing device and a high level of signaling over the network. For example, if the computing device must associate with a new access point whenever it enters the range of the new access point, the computing device must remain on at all times so that it may detect when it has entered the range of the new access point. Additionally, the computing device must remain on at all times to receive any incoming IP traffic. This continuous detection and repeated associating causes a tremendous drain on the computing device's power supply and adds to the signaling across the network.

To overcome these disadvantages, the IEEE 802.11 protocol includes dormant mode functionality. Dormant mode functionality (without paging functionality) allows a computing device to operate in two modes, an "active" mode and a "dormant" mode. In the active mode, the computing device can receive signals, such as IP traffic, and can send signals such as those sent when the computing device associates with an access point. In the dormant mode, the computing device is not turned off, but is put into a mode which reduces its ability to receive IP traffic by reducing the monitoring of certain channels and thus is a state of reduced power consumption. The computing device must be in active mode to send or receive IP traffic and associate with an access point. Therefore, the computing device must periodically go into active mode to associate with an access point and to send or receive IP traffic. Because IP traffic intended for the computing device may be transmitted while the computing device is in dormant mode, the IEEE 802.11 protocol incorporates buffers in the access points to queue IP traffic intended for the computing device. The computing device can then receive this IP traffic when it switches into active mode and therefore does not miss any IP traffic sent while it was in dormant mode. Although dormant mode functionality does provide some power savings for the computing device and reduced signaling across the network, the computing device must still periodically switch into active mode to register with each access point of which it is in range, and to send or receive IP traffic.

Further reductions in computing device power drain and signaling across the network can be accomplished through the use of paging. Paging is a method of notifying a dormant computing device of incoming IP traffic. Paging includes (i) the use of paging areas; and (ii) paging the computing device. The use of paging areas includes the creation of paging areas and having the computing device signal the network only when it crosses a paging area boundary. A paging area boundary is defined by the outer perimeter of the ranges of a collection of access points (an "access point group") that are used to locate a dormant computing device. This outer perimeter forms the paging area boundary of a paging area. Each paging area uniquely identifies itself to computing devices by periodically broadcasting that paging area's unique paging area identifier.

Generally, a network implementing paging will be arranged to have at least two paging areas. Only when a computing device crosses a paging area boundary from one paging area to another, does the computing device associate with the nearest access point. A computing device detects when it crosses a paging area boundary by detecting a change in the unique paging area identifier. However, because neighboring paging areas usually overlap with each other to prevent gaps in coverage, a computing device may be in more than one paging area simultaneously and thus will detect more than one paging area identifier. In this case, the computing device will detect the strength of the paging area identifier from each paging area that computing device is within and will associate with the paging area from which the strongest paging area identifier is broadcast.

The computing device is programmed to periodically go from dormant to active mode so that it may detect the unique paging identifier or identifiers being broadcast. By requiring a computing device to associate with the network only when it crosses a paging area boundary, the amount of signaling to the network is decreased and the amount of time the computing device can remain dormant is increased, thus power consumption is decreased. Further reduction in power usage and signaling by the computing device is realized because the computing device only periodically needs to switch into active mode.

One of the consequences of reducing the number of instances in which the computing device informs the network of its location in the previously-described manner is that the network does not know the location of the computing device within a given paging area. Because the computing device may have moved after the last time it associated with an access point, all that the network knows is that the computing device is located somewhere within the paging area in which the access point with which the computing device last associated is located (the "old access point"). In order for the network to forward IP traffic to the computing device, it must know the access point for which the computing device is currently in range (the "new access point") and alert the computing device about the pending IP traffic. The network precisely locates the computing device within a paging area by paging the computing device. Paging the computing device is signaling by the network through the access points directed to locating the computing device and alerting it to establish a connection. Paging the computing device involves transmitting a request to all the access points in the same paging area as the old access point. These access points then broadcast the paging signal. When the computing device receives the paging signal it associates with the new access point. Once the computing device associates with the new access point, the network knows the location of the computing device in terms of the access point in which it is in range.

The new access point then signals the old access point, the old access point sends any buffered IP traffic to the new access point and the new access point delivers the buffered IP traffic to the computing device. Power drain on the computing device and signaling over the network are reduced because the computing device only associates with a new access point in the same paging area when the computing device is paged.

Although many cellular-based wireless WAN protocols support paging, WLAN protocols, such as the IEEE 802.11, do not specifically provide standards or methods for implementing paging. For example, the IEEE 802.11 protocol does not have paging areas, a dedicated paging channel and a radio link protocol specifically directed towards locating a dormant computing device. Additionally, the IEEE 802.11 and other WLAN protocols lack the protocols for establishing and altering paging areas, associating a computing device with an access point, and performing paging. Furthermore, existing WLAN protocols do not address the issues of maintaining synchronization of the access points across each access point group and reducing signal interference among access points.

The advantages of the methods and apparatuses disclosed herein will be apparent from the following summary and detailed description of the preferred embodiments.

BRIEF SUMMARY

Apparatuses and methods are disclosed herein for implementing dormant mode with paging in a WLAN. Power savings in the computing device and reduction in traffic across the network are achieved by requiring a computing device to inform the WLAN of its location only when it crosses a paging area boundary or is to receive IP traffic. Dormant mode with paging is implemented in a protocol that supports dormant functionality but does not itself provide methods or standards for implementing dormant mode and paging functionality, such as the IEEE 802.11. The methods and apparatuses disclosed herein are implemented in such a protocol and provide the methods needed to implement dormant mode with paging in such a protocol. Generally, the methods and apparatuses for implementing dormant mode with paging basically include (1) establishing paging areas; (2) communicating access group information to a computing device; and (3) locating a computing device.

Establishing paging areas generally involves, forming at least two access point groups which includes; (a) defining the structure of the access point groups (b) establishing a protocol for communications among the access points in each access point group; and (c) establishing a protocol for manipulating the access point groups.

Paging areas are needed to enable the paging functionality and do so primarily by using paging groups to define paging area boundaries. The paging groups are generally formed from a subset of all the access points within the WLAN or network by defining the structure of the access point group which establishes the relationships among the access points. In another implementation, the relationships among the access points in a paging group may be defined by a tree structured distributed group model. A tree structured distributed group model has a hierarchical tree structure wherein access points are defined in terms of functionality as "master," "slave," or both.

Establishing a protocol for communications among the access points in an access point group may include developing a unique protocol or modifying an existing one such as the IEEE Inter Access Point Protocol ("IAPP"). Establishing a protocol for manipulating access point groups involves adding operations to the protocol for communications that enable the implementation of a tree structured distributed model. Implementing a tree structured distributed model for an access point group may be accomplished by extending the operations of IAPP. In order to form and manipulate a paging group, at least five operations must be added to IAPP. These operations include "join," "leave," "group merge," "group prune" and "devolution."

Once access point groups have been formed, they must have some way of communicating their identity to any computing device that is within the paging area that they define so that the computing devices can be located. The step of communicating access point group information to computing devices generally includes (a) including the access point group's paging area ID in the beacon of each access point in the access point group; (b) assigning a channel over which to broadcast the beacon; (c) awakening the computing device to periodically detect the beacon; and (d) synchronizing the timing of the beacon broadcasts of all the access points within an access point group.

Including an access point group's unique paging area ID in the beacon of each access point enables one paging group (or paging area) to be distinguished from another. Each paging group is assigned a unique paging area ID and communicates this paging area ID to any computing devices within that paging group's paging area so that a computing device can determine in which paging area it is located. This may be accomplished using a beacon packet or beacon, such as the beacon in the IEEE 802.11 protocol. Beacons are signals which are periodically broadcast to each of the access points and contain a variety of information including the paging area ID.

In assigning a channel over which to broadcast the beacon or other packet containing the access point ID, there are several issues to consider. It is advantageous for adjacent access points to broadcast the beacon over different channels because this helps avoid interference. It is also advantageous for the access points to broadcast the beacon or other packet over a different channel than that used to broadcast the IP traffic because this helps to avoid interference between the IP traffic and the beacon or other packet. However, the more channels that are used the more channels a computing device must search every time a computing device moves from the range of one access point into the range of another. Because there is a conflict in the requirements of channel separation and minimizing the number of channels, multiple methods of assigning the channel for beacon broadcasting are required so that the assignment can be optimized for a given situation.

Methods of channel assignment include: (1) static assignment; (2) standard common paging channel assignment; and (3) local common paging channel assignment method. In the static assignment method, all the access points in the WLAN are assigned the same common channel over which to broadcast the IP traffic and the beacon. In the standard common paging channel assignment method, the access points are assigned a universal common channel over which to broadcast the beacon and a different common channel over which to broadcast the IP traffic. In the local common paging channel assignment method, all the access points in the same access point group are assigned the same channel for paging with no adjacent access paging groups assigned the same paging channel and a channel for IP traffic that is different from any of the paging channels.

The timing of the beacon broadcasts for each access point within an access point group must be synchronized to occur approximately at the same time (the "beacon timing"). When the beacon broadcasts in an access point group all occur at the same time, the computing device only needs to be in active mode during the beacon timing no matter with which access point the computing device is associated. Synchronizing the beacon timing for the access points within an access point group involves the access points and the computing device. As the computing device moves from within the range of a first access point to within the range of a second access point, it senses the difference between the beacon timing of the first access point and the second access point to ascertain a "beacon timing difference." The computing device then communicates this beacon timing difference to the second access point which communicates the beacon timing difference to the first access point. The beacon timing of the first or second access point or both are synchronized.

Locating a computing device includes associating the computing device with an access point or access point group whenever it crosses an access point boundary, and whenever it is paged. Whenever a computing device crosses an access point boundary, it must associate with a new access point in a new access point group. Whenever a computing device is paged, it must associate with the access point for which it is in range so that it can receive IP traffic. To associate with an access point, the computing device sends a request to associate to the new access point. Thereafter, an association identification ("AID") is assigned to the computing device.

BRIEF DESCRIPTION OF SEVERAL VIEWS OF THE DRAWINGS

The methods and apparatuses disclosed herein provide numerous embodiments which will be understood by those skilled in the art based on the present disclosure. Some of these are described below and are represented in the drawings by means of several figures, in which:

FIG. 12A is a diagram of the beacon elements in the IEEE 802.11 protocol according to the prior art;

FIG. 12B is a is a diagram of the beacon elements in the IEEE 802.11 protocol according to a preferred embodiment;

FIG. 12C is a diagram of the format of the paging ID according to a preferred embodiment;

DETAILED DESCRIPTION

Identical features are marked with identical reference symbols in the indicated drawings. Disclosed herein is a method and apparatus for implementing dormant mode with paging in a WLAN. The method for implementing dormant mode with paging basically includes the steps of (1) establishing paging areas; (2) communicating access group information to a computing device; and (3) locating a computing device. Although the following example will describe this method and apparatus using one computing device, it may be used for a plurality of computing devices. It is to be understood that the following example(s) is (are) for the purpose of explanation and not limitation.

The step of establishing paging areas generally involves, forming at least two access point groups which includes; (a) defining the structure of the access point groups (b) establishing a protocol for communications among the access points in each access point group; (c) establishing a protocol for manipulating the access point groups.

Figure 1:
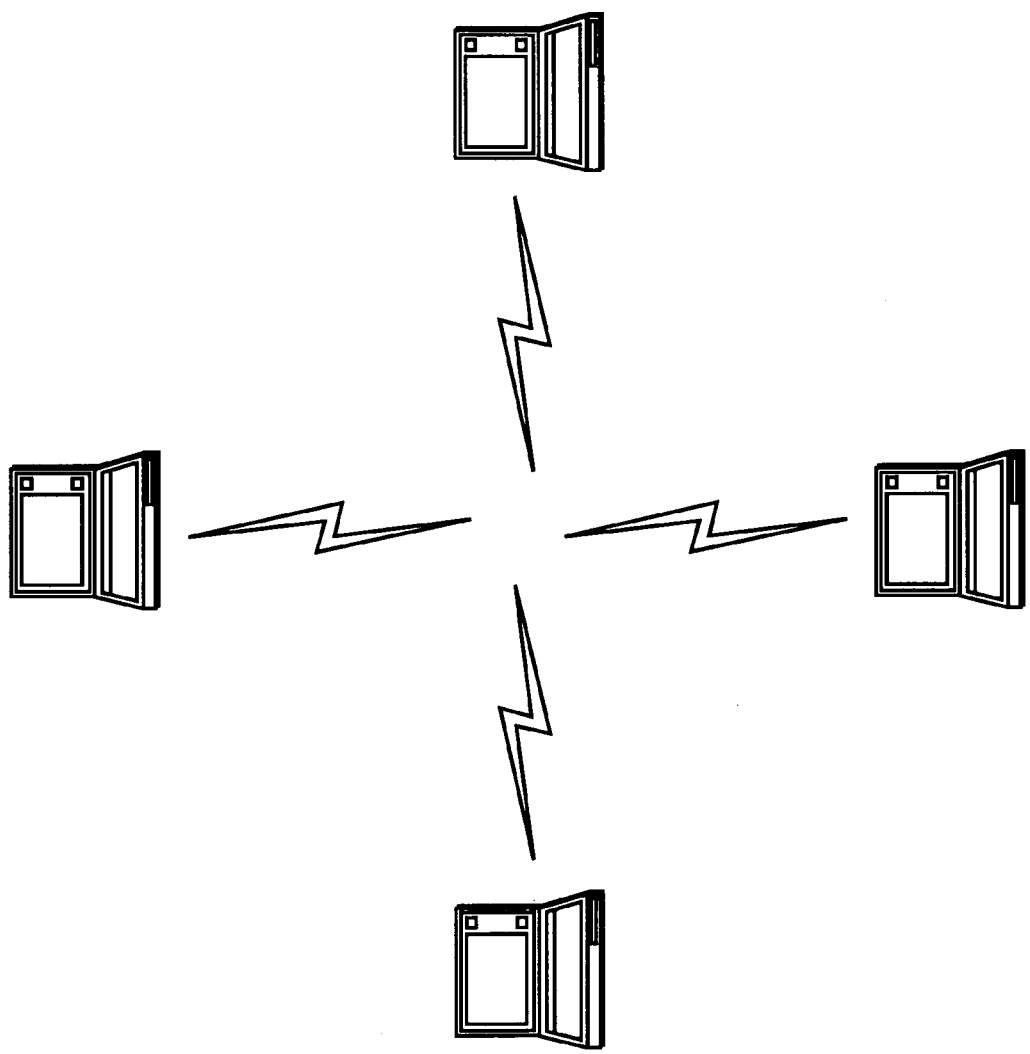
FIG. 1 is a diagram of a wireless network with an ad hoc architecture according to the prior art.
Figure 2:
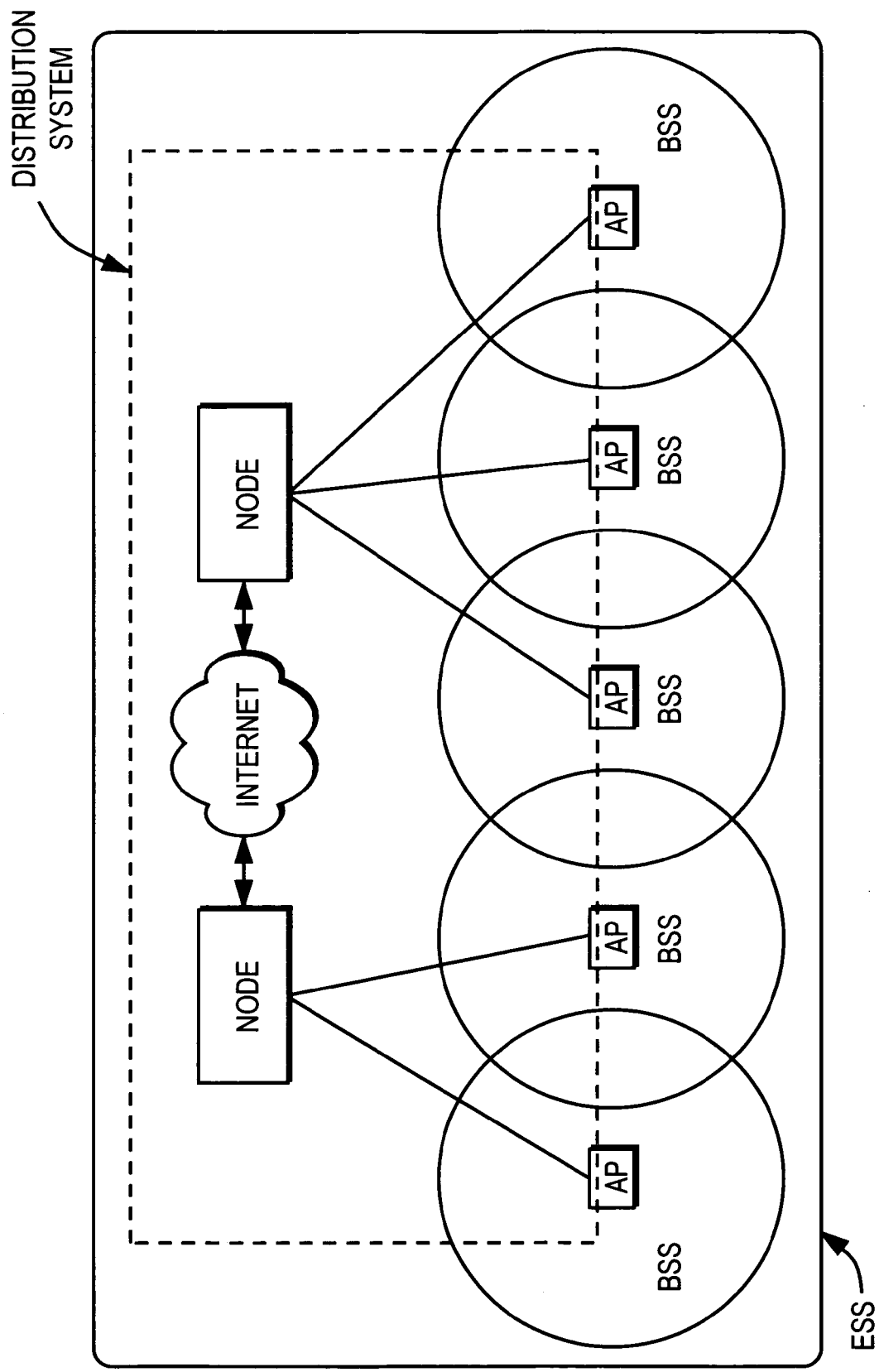
FIG. 2 is a diagram of a wireless network with an infrastructure architecture according to the prior art.
Figure 3:
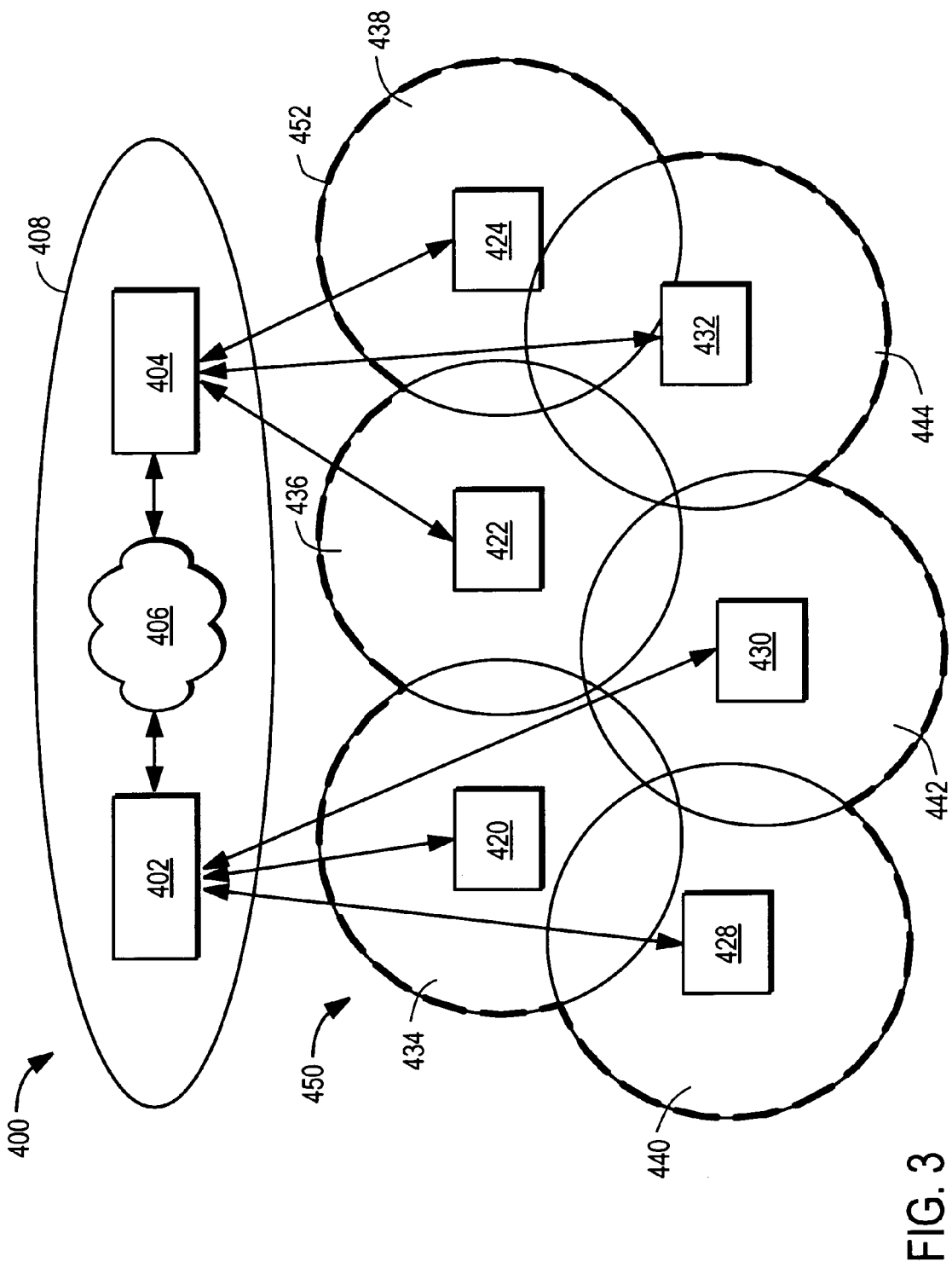
FIG. 3 is a diagram of a WLAN that supports paging according to the a preferred embodiment.

Generally, paging areas are defined by the outermost perimeter of the ranges of the outermost access point groups within a paging group. This outer most perimeter is the paging area boundary. The paging groups are generally formed from a subset of all the access points within the WLAN or network by defining the structure of the access point group which establishes the relationships among the access points. One example is shown in FIG. 3 wherein a WLAN 400 for which a paging area has been defined is shown. In this WLAN 400, there are two nodes 402 and 404 connected to a network 406, such as the internet, by some type of wired connection. A plurality of access points 420, 422, 424, 428, 430 and 432 are connected to nodes 402 and 404 via some type of wired connection. The access points 420, 422, 424, 428, 430 and 432 are grouped together so that the ranges of the access points 434, 436, 438, 440, 442 and 444 define a paging area 450 having a paging area boundary 452.

Figure 4:
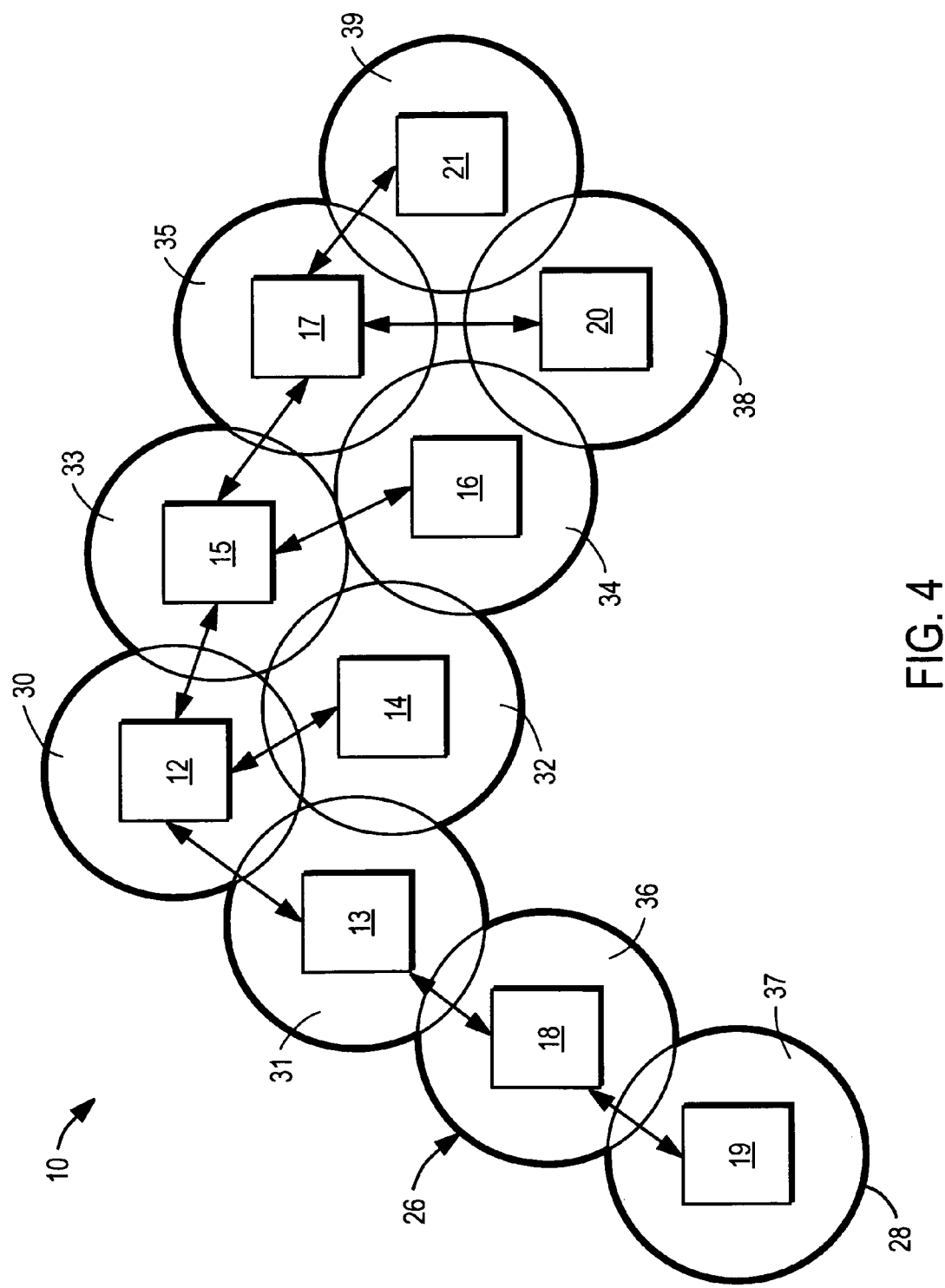
FIG. 4 is a diagram of an access point group that uses a structured distributed grouping model according to a preferred embodiment.

In another example, the relationships among the access points in a paging group may be defined by a tree structured distributed group model. FIG. 4 shows an access point group 10 wherein the relationships among the access points 12-21 in the access point group 10 are defined by a distributed group model. The paging group 10 is comprised of access points 12-21 and defines a paging area 26. The paging area boundary 28 is defined by the outermost perimeters of the ranges 30-39 of the access points 12-21, and encloses the paging area 26.

A tree structured distributed group model has a hierarchical tree structure. In the hierarchical tree structure, each access point is connected to one or more access points directly below it. Additionally, access points are defined in terms of functionality as "master," "slave," or both. A master is an access point to which other access points belong and which has the ability to control the access points that belong to it. In FIG. 4, the master access points are 12, 13, 15, 17 and 18. A slave is an access point that belongs to a master. In the access point group 10, the slave access points are 13-21. It is possible to be a master and a slave with the functionality of both at the same time, such as access points 13, 15, 17 and 18. Additionally, an access point may be the master of more than one access point as are access points 12, 15 and 17. However, an access point may not have more than one master. If an access point is simultaneously both a master and a slave, the master must follow the slave's attributes. Each access point group has one access point to which all others belong, directly or indirectly. This is called the "root access point" (access point 12). Access points at which the tree structure terminates are called "leaf access points" (access points 14, 16, 19, 10 and 21). All remaining access points are called "intermediate access points" (access points 13, 15, 17 and 18).

Figure 5:
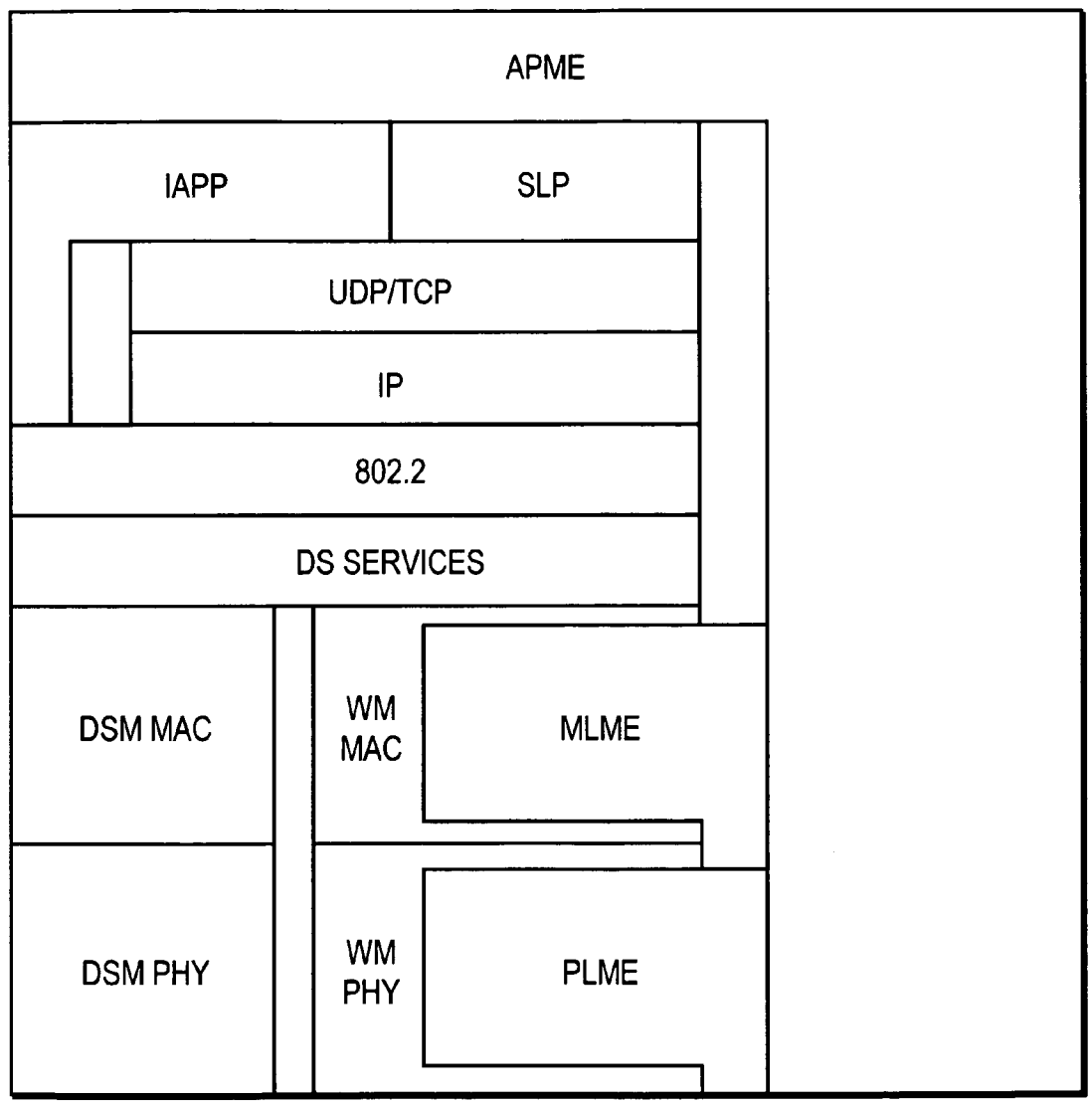
FIG. 5 is a diagram of IAPP architecture according to the prior art.

Establishing a protocol for communications among the access points in an access point group may include developing a unique protocol or modifying an existing one. The IEEE Inter Access Point Protocol ("IAPP") is an existing protocol between access points that allows conformant access points from multiple vendors to interoperate on a common distribution system. IAPP specifies the functionality of the access points (which describes service primitives), a set of functions and a protocol that will allow IP packets to be carried between access points. FIG. 5 shows the IAPP architecture. The access point management entity or APME 40 is used as the main operational program of the access point, implementing the access point manufacturer's proprietary features and algorithms. A tree structured distributed model for the access point group is implemented in the APME.

Establishing a protocol for manipulating access point groups involves adding operations that enable the implementation of a tree structured distributed model. Implementing a tree structured distributed model for an access point group in APME may be accomplished by extending the operations of IAPP. In order to form a paging group, at least five operations must be added to IAPP. These operations include "join," "leave," "group merge," "group prune" and "devolution." Examples of these operations are shown in FIGS. 6A-13B.

The join operation performs the steps needed to add an access point to an existing access point group. The simplest case involves joining one access point to another access point. The first access point will send a join request to a second access point. The second access point will permit the first access point to join with it and will form the tree structure of the access point group with itself as the root access point. It does this by added the first access point to its cluster map ("CMAP") as a slave. The CMAP is a list of all the access points in the access point group. The second access point will then send a join reply back to the first access point. The first and second access points now form an access point group with the second access point as the root access point and the first access point as the leaf access point.

In order to join an access point to an access point group containing more than one access point, the joining access point sends a join request to one of the access points in the access point group. If the access point receiving the join request is not the root access point of the group, it forwards the join request to its master. This step is repeated until the join request reaches the root access point. The root access point then permits the requesting access point to join by adding it to its CMAP and sending a join reply back to the joining access point through the same access points that forwarded the join request to the root access point but in reverse order. Before sending the join reply to the joining access point, the access point that received the join request from the joining access point will add the joining access point to its CMAP as a slave. However, it is possible for the root access point to deny entry to the requesting access point. For example, if the root access point may include a limitation on the number of access points that can be included in its access point group, the root access point will deny entry to the requesting access point by communicating back to the requesting access point a no join reply.

Figure 6A:
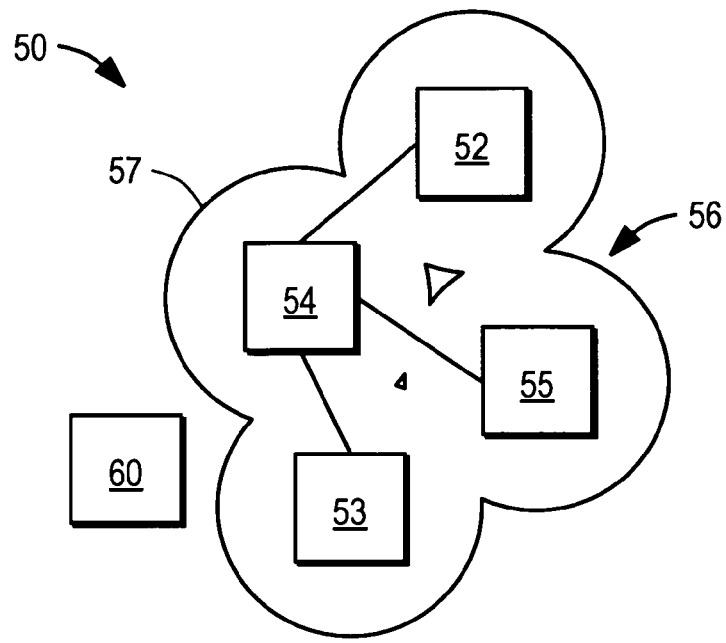
FIG. 6A is diagram of an access point and access point group, according to a preferred embodiment.
Figure 6B:
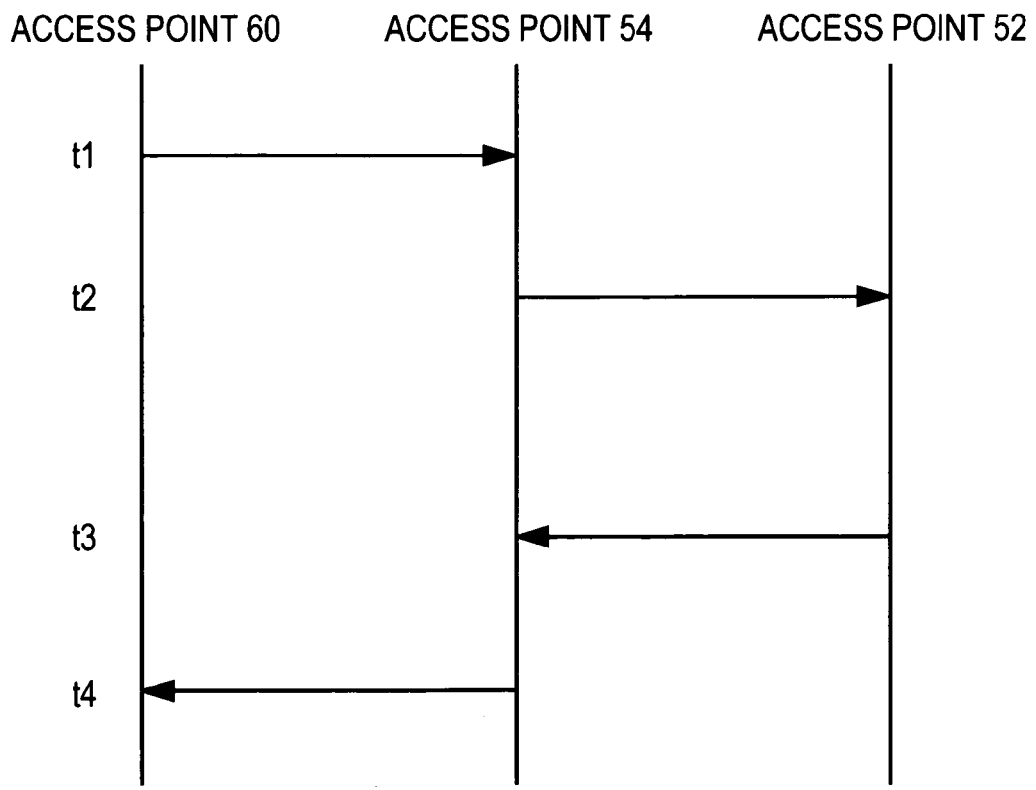
FIG. 6B is a diagram of steps in a join operation, according to a preferred embodiment.
Figure 6C:
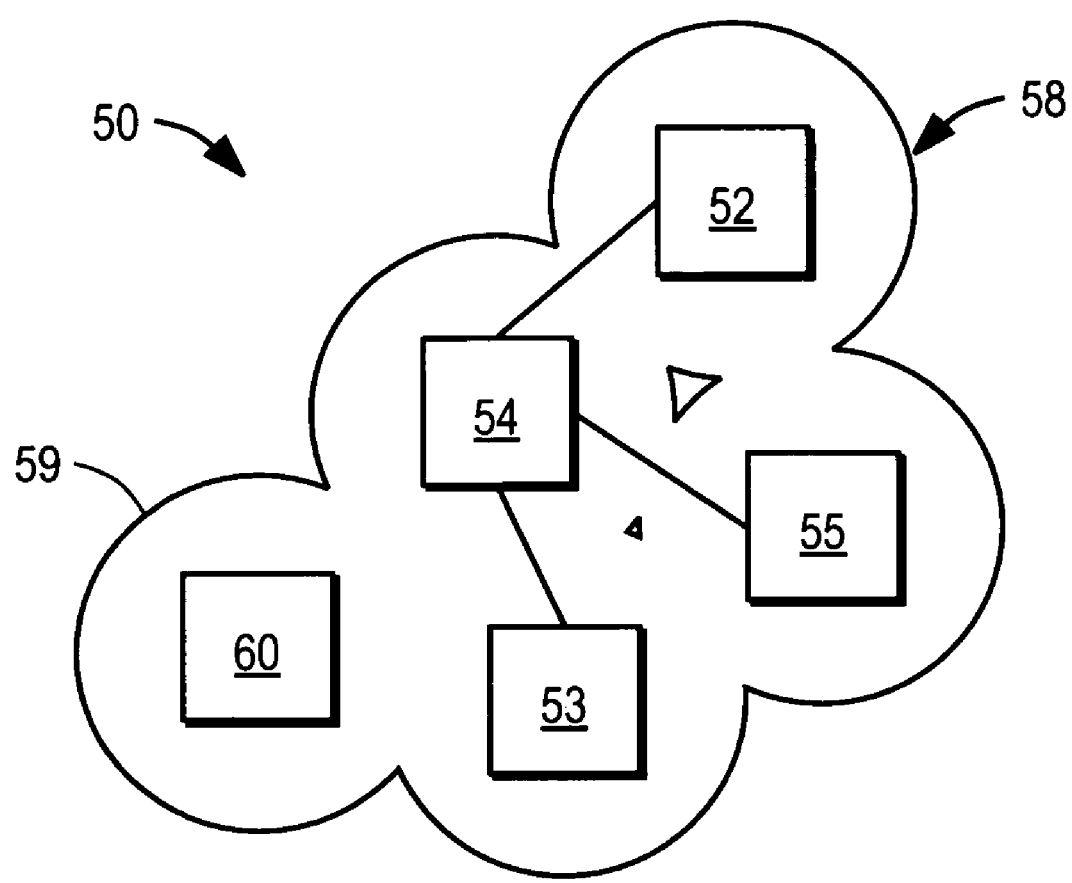
FIG. 6C is a diagram of an access point group after the join operation of FIG. 6B is performed, according to a preferred embodiment.

FIGS. 6A-C demonstrate the steps included in one embodiment of the join operation. FIG. 6B shows the steps in the join operation while FIG. 6A shows an access point 60 and an access point group 50 before the operation is performed and FIG. 6C shows the access point group 50 after the operation has been performed. The access point group 50 in FIG. 6A includes the root access point 52, an intermediate access point 54 and two leaf access points 53 and 55. The access point group 50 defines a paging area 56 with paging area boundary 57. As shown in FIG. 6B, when access point 60 is to be added to access group 50, access point 60 sends a join request to one of the access points 54 in the access point group 50 at time t1. Access point 54 forwards this join request to the root access point at 52 at time t2. The root access point 52 then permits access point 60 to join by adding it to its CMAP and sending a join reply back to access point 54 at time t3. Access point 54 adds access point 60 to its CMAP as a slave and then forwards the join reply to access point 60 at time t4. FIG. 6C shows access point group 50 after the forgoing use of the join operation. Access point 60 is part of access point group 50 and is the slave of access point 54. Access point group 50 has an enlarged paging area boundary 59 surrounding an enlarged paging area 58.

In a further embodiment of the join operation, where a first access point group attempts join a second access point group, the join operation is defined so that only the root access point of the first access point may request to join with the second access point group. This prevents slave access points from having more than one master which would result if a slave access point would join another access point group. In yet a further embodiment of the join operation, where a first access point group attempts join a second access point group, there is no restriction on which access points in the first access point group may request to join a second access point group. However, because a slave access point can only have one master at a time, if a slave access point in the first access point group requests to join the second access point group, the slave access point group must leave the first access point group before the join request will be allowed.

When an access point is to leave an access point group containing more than one access point, the leaving access point sends a leave request to one of the access points in the access point group. If the access point receiving the leave request is not the root access point of the group, it forwards the leave request to its master. This step is repeated until the leave request reaches the root access point. The root access point then permits the leaving access point to leave by deleting it from the CMAP and sending a leave reply back to the leaving access point through the same access points that forwarded the leave request to the root access point but in reverse order. Before sending the leave reply to the leaving access point, the access point that received the leave request from the leaving access point will remove the leaving access point from its CMAP.

Figure 7:
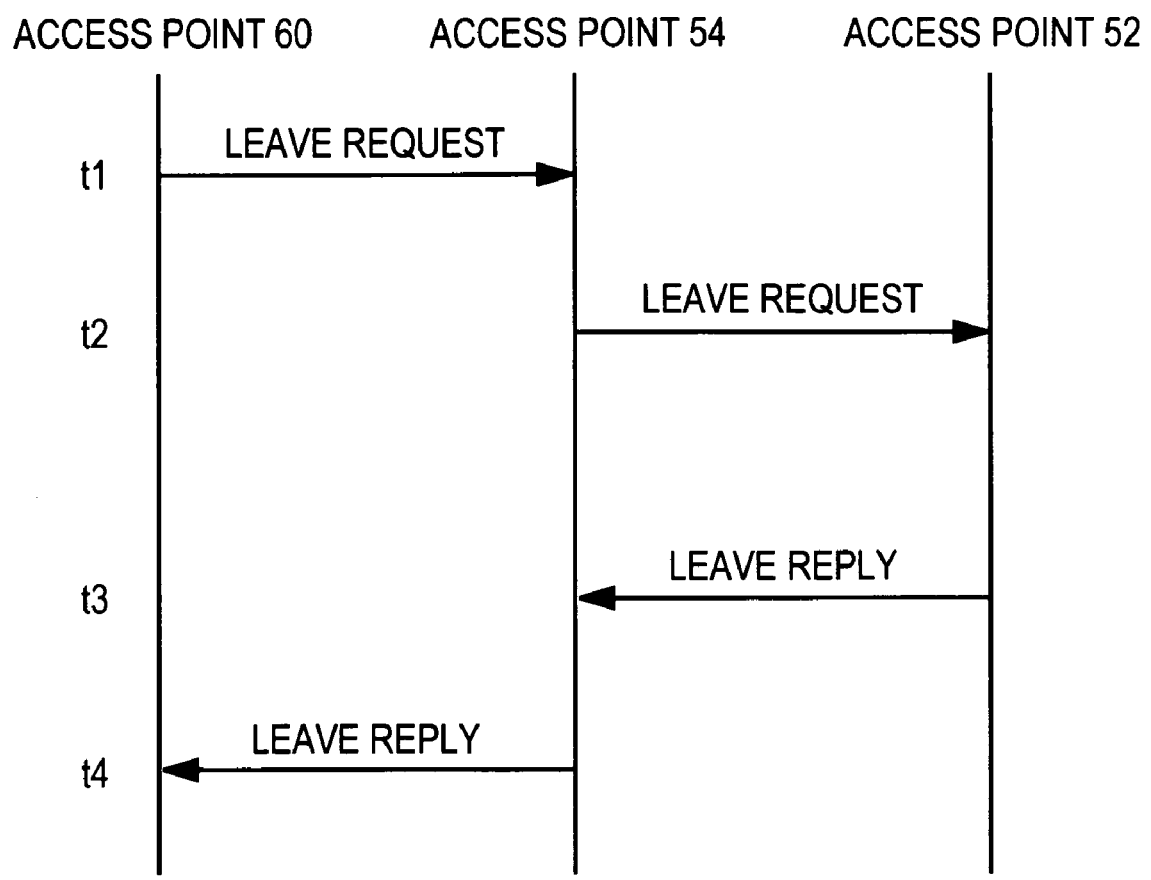
FIG. 7 is a diagram of steps in a leave operation, according to a preferred embodiment.

FIG. 7 and FIGS. 6C and 6A demonstrate the steps included in one embodiment of the leave operation. FIG. 7 shows the steps in the leave operation when a leaf access point leaves an access point group, while FIG. 6C shows the access point group 50 before the leave operation is performed, and FIG. 6A shows an access point 60 and the access point group 50 after the leave operation has been performed. The access point group 50 in FIG. 6C includes the root access point 52, an intermediate access point 54 and three leaf access points 53, 55 and 60. The access point group 50 defines a paging area 58 with paging area boundary 59. As shown in FIG. 7, when access point 60 is to be removed from access group 50, access point 60 sends a leave request to one of the access points 54 in the access point group 50 at time t1. Access point 54 forwards this leave request to the root access point at 52 at time t2. The root access point 52 then permits access point 60 to leave by deleting it from its CMAP and sending a leave reply back to access point 54 at time t3 wherein access point 54 removes access point 60 from its CMAP and then forwards the leave reply to access point 60 at time t4. FIG. 6A shows access point group 50 and access point 60 after the leave operation has been performed. Access point 50 has a reduced paging area boundary 57 surrounding a reduced paging area 56.

Figure 8A:
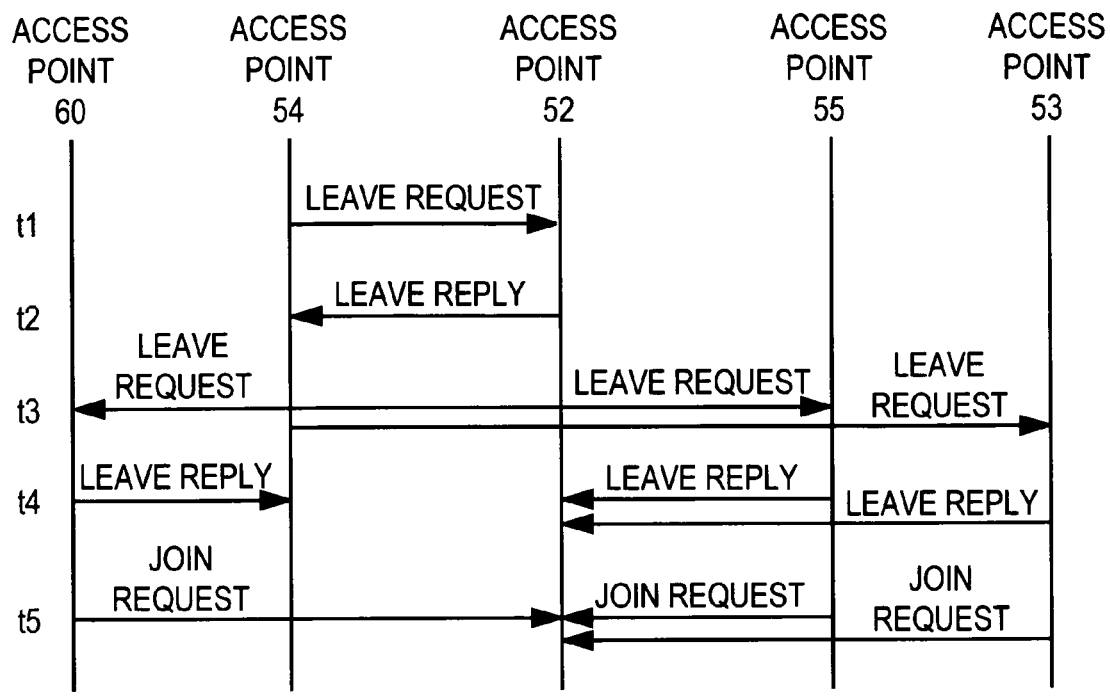
FIG. 8A is a diagram of steps in a leave operation according to a preferred embodiment.
Figure 8B:
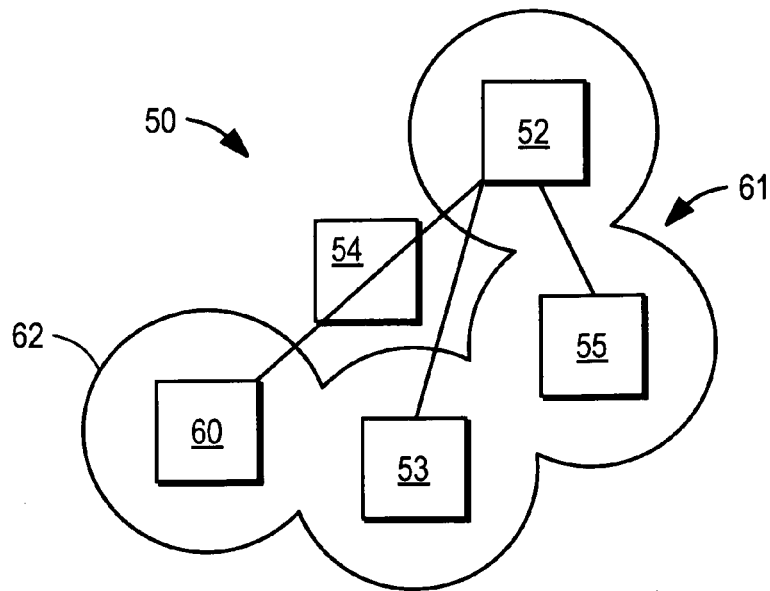
FIG. 8B is a diagram of an access group and an access point after the leave operation of FIG. 8A is performed, according to a preferred embodiment.
Figure 9A:
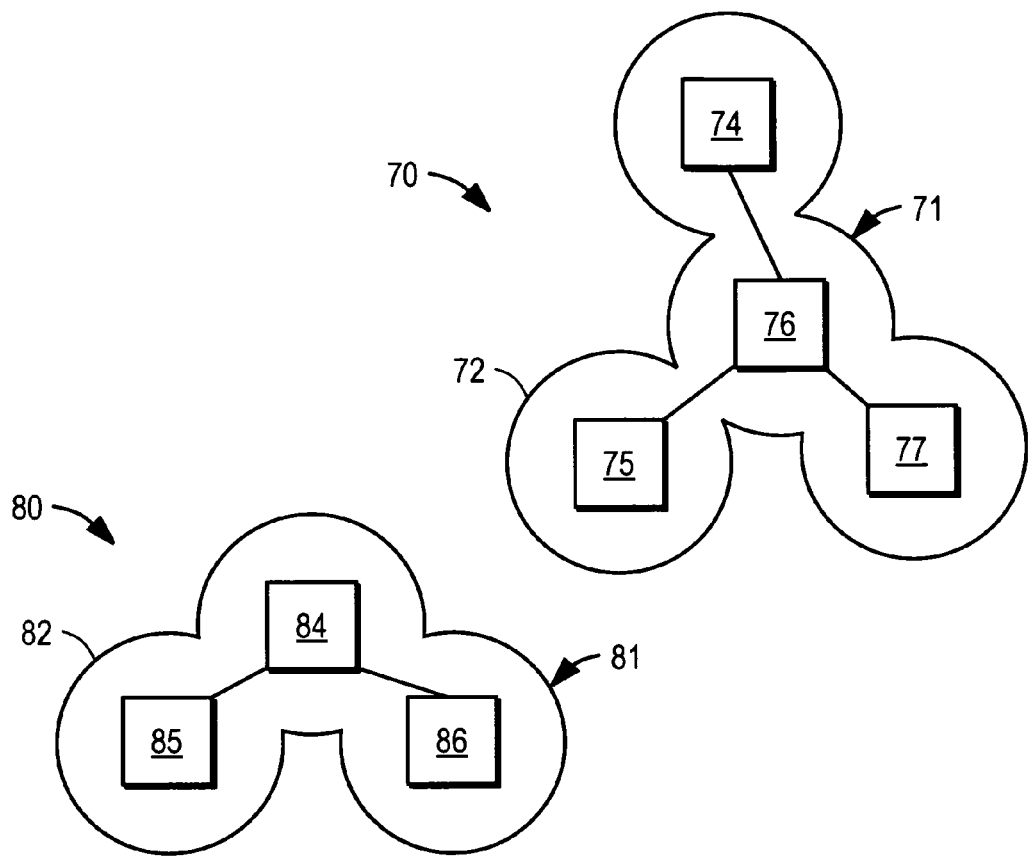
FIG. 9A is a diagram of a first and a second access group, according to a preferred embodiment.
Figure 9B:
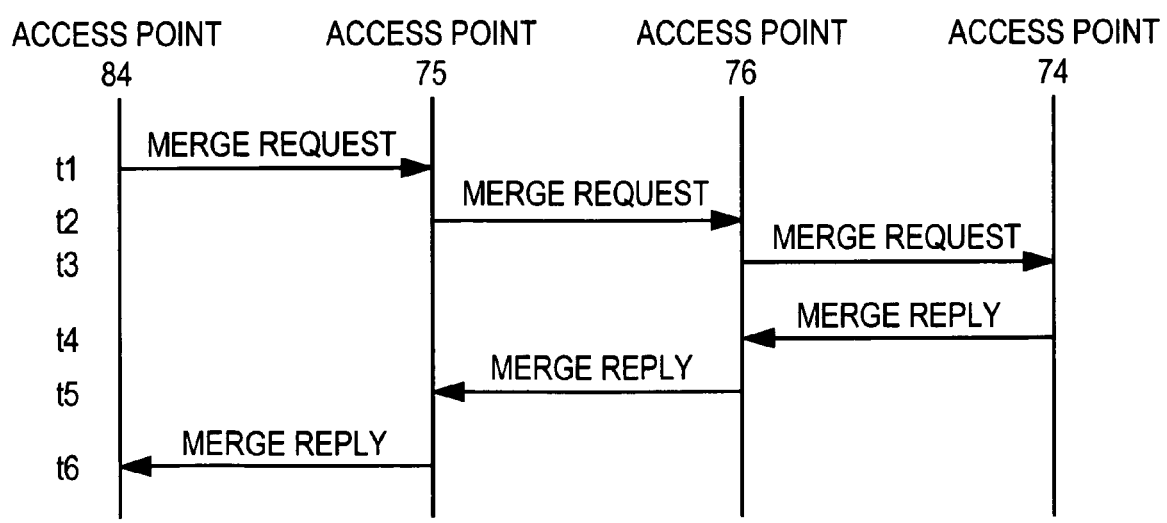
FIG. 9B is a diagram of steps in a group merge operation, according to a preferred embodiment.

Another implementation of the leave operation involves removing an intermediate access point from an access point group. In this implementation, the intermediate access point is directly connected to its master and three leaf access points and is shown in FIGS. 6C, 9A and 9B. Implementing the leave operation to remove an intermediate access point may also be called "grafting" because it involves removing the intermediate access point from an access point group and then rejoining the slaves of the leaving access point to the access point group. The access point group 50 in FIG. 6C includes the root access point 52, intermediate access point 54 and three leaf access points 53, 55 and 60. The access point group 50 defines a paging area 58 with paging area boundary 59. As shown in FIG. 8A, when intermediate access point 54 is to leave access group 50, access point 54 sends a leave request to its master (root access point 52) at time t1. The root access point 52 then permits access point 54 to leave by deleting it from its CMAP and sending a leave reply back to access point 54 at time t2. Access point 54 then sends a leave request to its slaves, access point 60, 53 and 55, at time t3 Access points 60, 53 and 55 then send leave requests back to access point 54 at time t4, at which time access point 55 removes access points 60, 53 and 55 from its CMAP. So that access points 60, 53 and 55 are not removed from access point group 50, access points 60, 53 and 55 send a join request to root access point 52. Access points 60, 53 and 55 and access group 50 go through the join operation as described herein. FIG. 8B shows access point group 50 and access point 55 after the forgoing use of the leave operation. Access point group 50 now has a reduced paging area boundary 62 surrounding a reduced paging area 61.

In order to combine two access point groups to form a single access point group, the root access point, and only the root access point, of a first access point group sends a merge request to one of the access points in a second access point group. If the access point receiving the merge request is not the root access point of the group, it forwards the merge request to its master. This step is repeated until the merge request reaches the root access point. The root access point of the second access point group then permits the second access point group to merge with second access point group by adding the first access point group to the CMAP of the root access point of the second access point group and sending a merge reply back to the root access point of the first access point group through the same access points in the second access point group that forwarded the merge request to the root access point of the second access point group, but in reverse order. Before sending the merge reply to the root access point of the first access point group, the access point in the second access point group that received the merge request from the root access point of the first access point group will add the root access point of the first access point group to its CMAP.

Figure 9C:
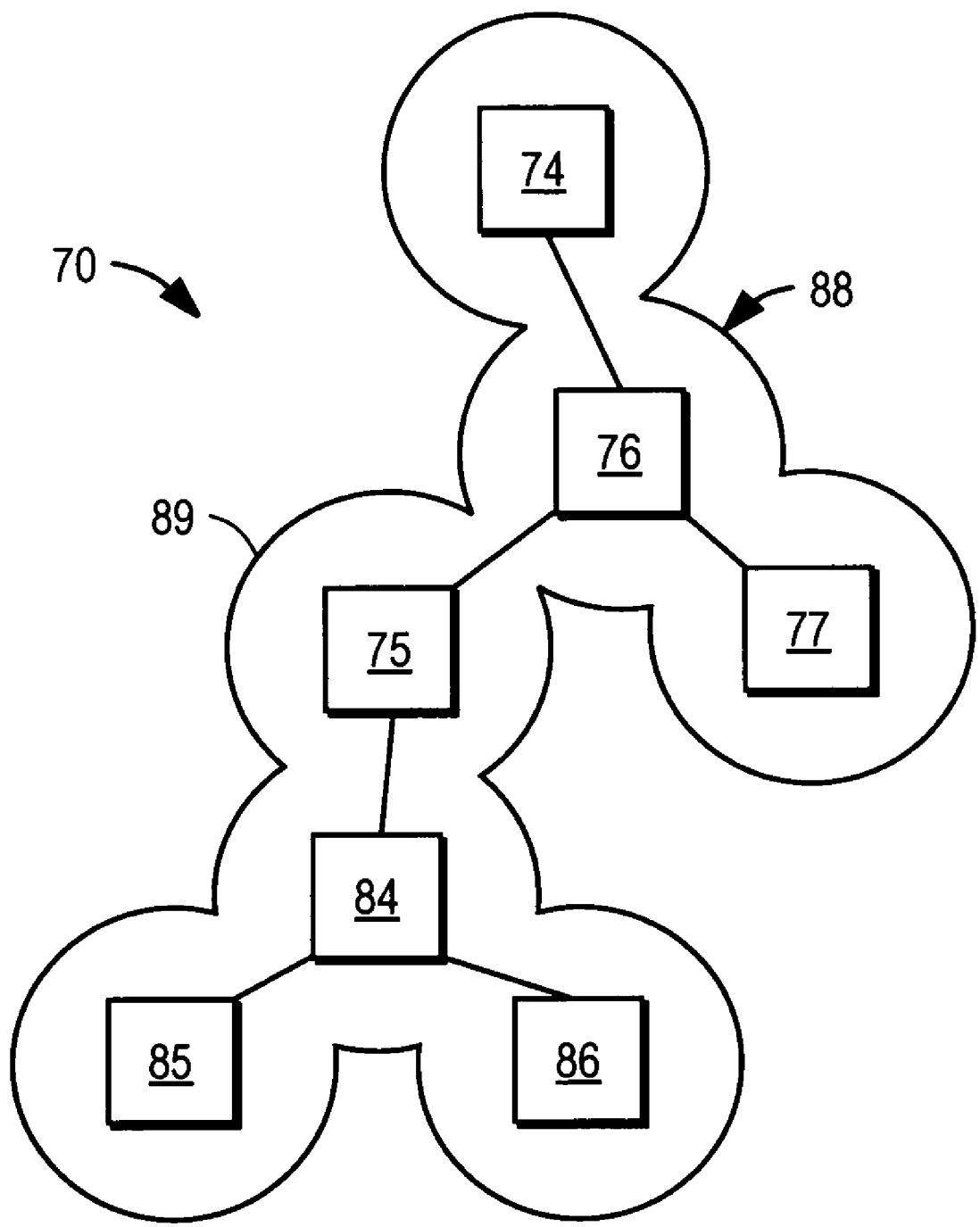
FIG. 9C is a diagram of an access group after the group merge operation of FIG. 10B is performed, according to a preferred embodiment.

FIGS. 9A-9C demonstrate the steps included in one embodiment of the merge operation. FIG. 10B shows the steps in the merge operation, FIG. 9A shows two access point groups 70 and 80 before a merge operation is performed, and FIG. 9C shows the access point group 70 after the merge operation has been performed. The access point group 70 in FIG. 9A includes the root access point 74, an intermediate access point 76 and two leaf access points 75 and 77. The access point group 70 defines a paging area 71 with paging area boundary 72. The access point group 80 includes the root access point 84 and two leaf access points 85 and 86. The access point group 80 defines a paging area 81 with paging area boundary 82. As shown in FIG. 9B, when access point 80 is to be merged with access group 70, the root access point 84 of access point group 80 sends a merge request to one of the access points 75 in the access point group 70 at time t1. Access point 75 forwards this merge request to access point 76 at time t2 and access point 76 forwards the merge request on to the root access point 74 of access point group 70 at time t3. The root access point 74 then permits access point group 80 to merge with access point group 70 by adding access point 84 to its CMAP and sending a merge reply back to access point 76 at time t4. Access point 76 then forwards the merge reply to access point 75 at time t5. Access point 75 adds access point 80 to its CMAP and then forwards the merge reply to root access point 84 at time t6. FIG. 9C shows access point group 70 after the forgoing use of the merge operation. Access point group 70 has an expanded paging area 88 defined by an expanded paging area boundary 89.

In order for a first access point to cut the access points that directly or indirectly depend from it, the first access point sends a prune inquiry request to its master. If the access point receiving the prune inquiry request is not the root access point of the access point group, the access point receiving the prune inquiry request forwards the prune inquiry request to its master. This step is repeated until the prune inquiry request reaches the root access point. The root access point then permits the first access point to prune its dependent access points by removing the dependent access points from the root access point's CMAP and sending a prune inquiry reply back to the first access point through the same access points that forwarded the prune inquiry request to the root access point (the "intermediate access points"), but in reverse order. The prune inquiry reply contains a CMAP which has a list of the dependent access points of the requester access point. The intermediate access points all remove the dependent access points from their CMAPs. The first access point then sends a prune request to each of its slave access points. The slave access points then send a prune reply back to the first access point. The first access point then removes the slave access points from its CMAP and each slave access point is removed from the access point group of the first access point. The removed slave access points may become the root access point of a new access point group if the slaves have slaves of their own, or they may stand alone.

Figure 10A:
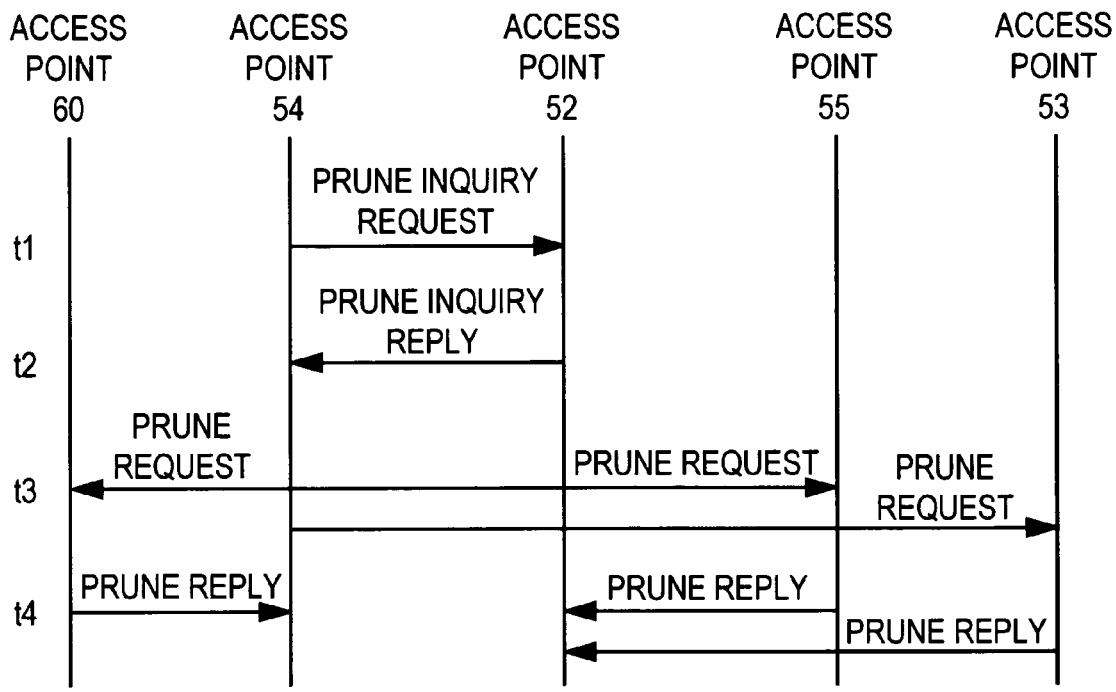
FIG. 10A is a diagram of steps of a group prune operation, according to a preferred embodiment.
Figure 10B:
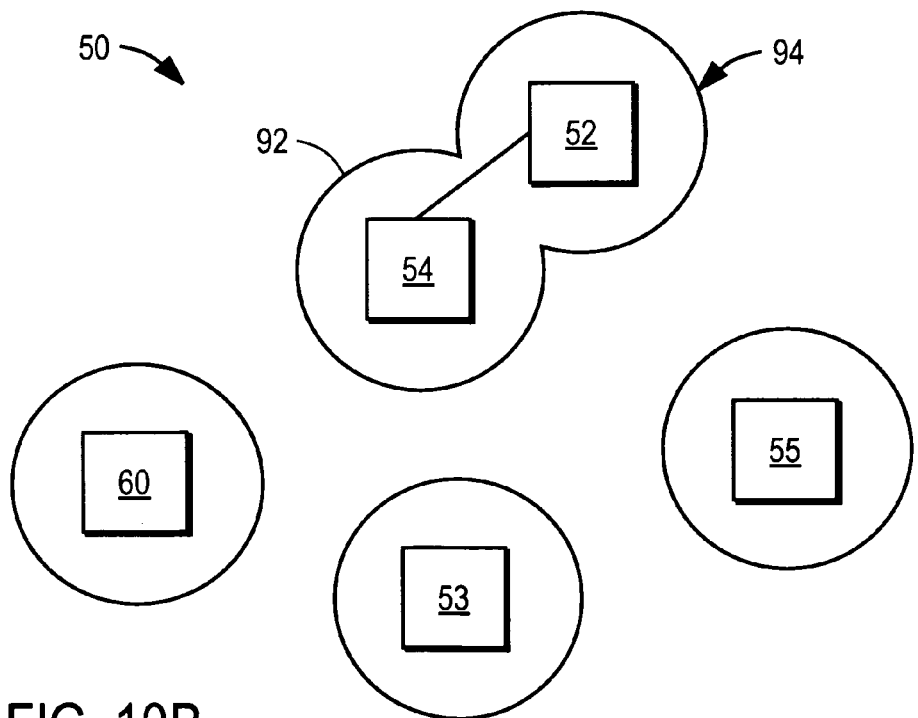
FIG. 10B is a diagram of a first and a second access group after the group prune operation of FIG. 10A is performed, according to a preferred embodiment.

FIG. 6C, 10A and 10B demonstrate the steps included in an example of one embodiment of the prune operation. FIG. 10A shows the steps in the prune operation, while FIG. 6C shows an access point group 50 before a prune operation is performed, and FIG. 10B shows the access point groups 50 and 96 after the prune operation has been performed. As shown in FIG. 10A, when access point 54 is to prune access points 55, 53 and 60, access point 54 sends a prune inquiry request to the root access point 52 at time t1. The root access point 52 then permits access point 54 to prune its dependent access points 53, 55 and 60 by removing the dependent access points 53, 55 and 60 from root access point's 52 CMAP and sending a prune inquiry reply back to access point 54 at time t2. The prune inquiry reply contains a CMAP containing access point 54's dependent access points. Access point 54 removes access points 53, 55 and 60 from its CMAP and then sends a prune request to access points 53, 55 and 60 at time t3. Access points 53, 55 and 60 then sends a prune reply back to access point 54 at time t4. FIG. 10B shows access point group 50 and access points 53, 55 and 60 after the forgoing use of the prune operation. Access point group 50 has a reduced paging area 92 defined by a reduced paging area boundary 94. Access points 53, 55 and 60, are free-standing access points which are not the member of any access point group.

When a root access point is to leave an access point group, the devolution operation is used. The devolution operation begins when the root access point sends a devolution request containing all the CMAPs and a delegation of the root role to its slaves. The slaves then send a devolution reply back to the root access point. The root access point removes all the slaves from its CMAP. Each of the slave access points then become the root access point for a new access point group. Each of the newly-formed root access points then sends a delegation request to each of its respective slaves. If any of the slaves is not a leaf access point, then that slave forwards the delegation request its slaves. This forwarding process continues until every leaf access point receives the delegation request. Each slave then sends back a delegation reply to its respective newly-formed root access point.

Figure 11A:
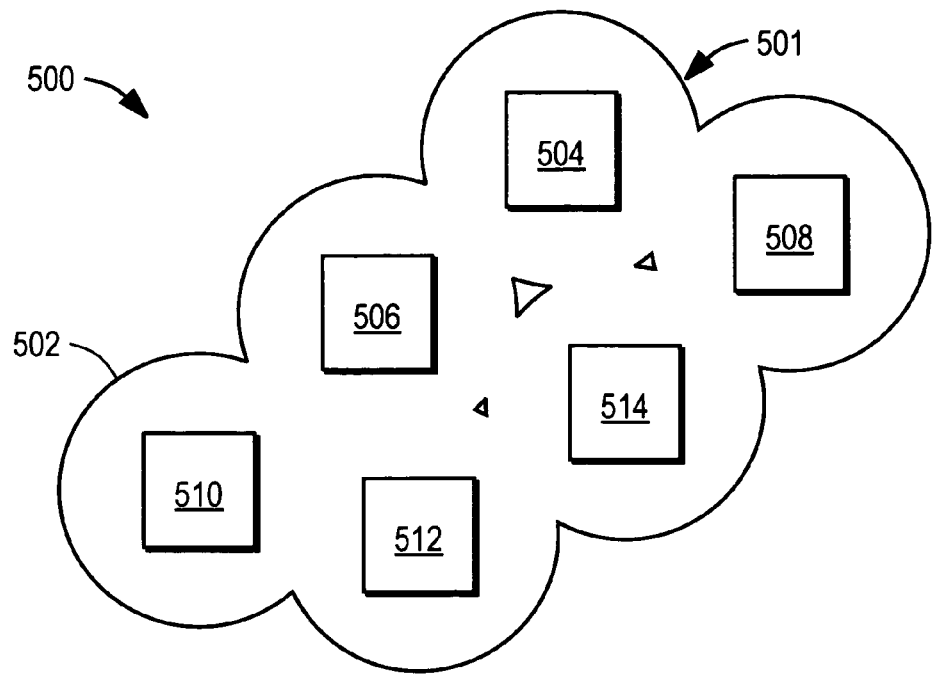
FIG. 11A is a diagram of an access group before a group devolution operation is performed, according to a preferred embodiment.
Figure 11B:
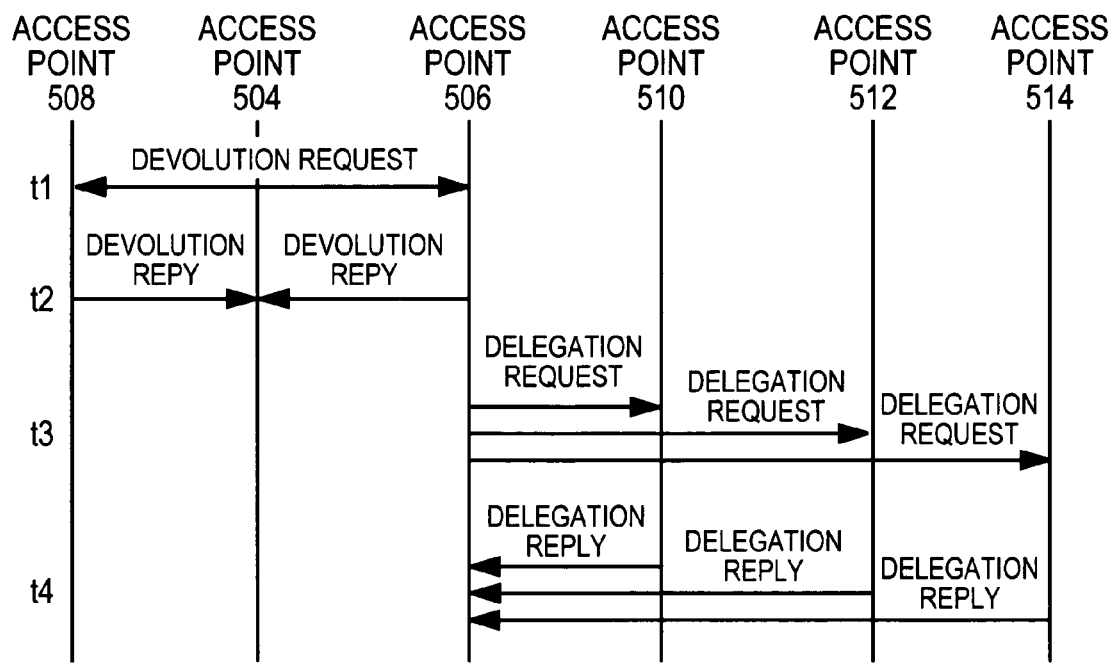
FIG. 11B is a diagram of steps of a group devolution operation, according to a preferred embodiment.
Figure 11C:
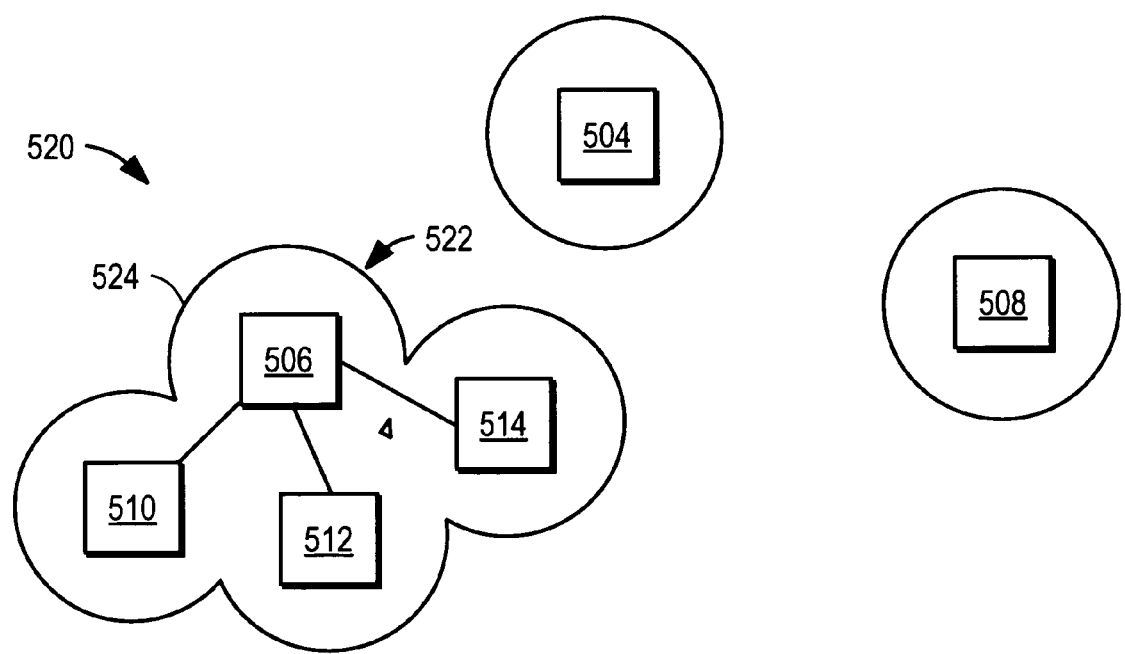
FIG. 11C is a diagram of an access group and a two access points after the group devolution operation of FIG. 11B is performed, according to a preferred embodiment.

FIG. 11A, 11B and 11C demonstrate the steps included in one embodiment of the devolution operation. FIG. 11A shows an access point group 500 before a devolution operation is performed, FIG. 11B shows the steps in the devolution operation, and FIG. 11C shows two access points 504 and 508 and access point group 520 after the devolution operation has been performed. Access point group, as shown in FIG. 11A, includes a root access point 504, intermediate access points 506 and 508 and leaf access points 510, 512 and 514. Access group 500 has a paging area 501 defined by a paging area boundary 502. As shown in FIG. 11B, when root access point 504 is to leave access point group 500, access point 504 sends a devolution request containing all the CMAPs to its slave access points 506 and 508 at time t1. Access points 506 and 508 then send a devolution reply to root access point 504 at time t2. Root access point 504 then removes the dependent access points 508, 508, 510, 512 and 514 from its CMAP. Access point 506 then sends a delegation request to its slave access points 510, 512 and 514 at time t3. Access points 510, 512 and 514 then send a delegation reply back to access point 504 at time t4. FIG. 11C shows a new access point group 520 and access point 504 and 508 after the forgoing use of the devolution operation. New access point group 520 has a paging area 522 defined by a paging area boundary 524.

Once access point groups have been formed, they must have some way of communicating their identity to any computing device that is within the paging area that they define so that the computing devices can be located. The step of communicating access point group information to computing devices generally includes the steps of (a) including the access point group's paging area ID in the beacon of each access point in the access point group; (b) assigning a channel over which to broadcast the beacon; (c) awakening the computing device to periodically detect the beacon; and (d) synchronizing the timing of the beacon broadcasts of all the access points within an access point group. Although the following examples will discuss these methods with regard to a single computing device for clarity, the methods may also be applied when a plurality of computing devices are present.

The step of including an access point group's unique paging area ID in the beacon of each access point enables one paging group (or paging area) to be distinguished from another. So that a computing device can determine in which paging area it is located, each paging group is assigned a unique paging area ID and communicates this paging area ID to any computing devices within its respective paging area. This may be accomplished using the beacon packet (hereinafter "beacon") in the IEEE 802.11 protocol.

Beacons provide a mechanism for access points in an access group to communicate with each other. The beacon is a signal that is periodically broadcast by each of the access points and can contain a variety of information. Each packet of information in the beacon is called an "element." The beacon included in the IEEE 802.11 protocol contains the elements 110 shown in FIG. 12A. The elements are identified by an element name and an element ID. Element IDs 32-255 are reserved and therefore available for use. FIG. 12B shows the enhanced elements 110 which contain a paging area ID 112 at one of the formerly-reserved elements, element ID 32. The other reserved elements 114 remain available for use.

FIG. 12C shows the format of the paging area ID 120. This format includes a one octet space for the element ID, a one octet space for the length of the paging area ID 124, and an eight octet space for the paging area ID itself 128. The paging area ID can include one or both of EUI 48 and EUI 64 (the MAC address). Alternatively, the paging area ID can include any other indicator so long as that indicator is unique to each paging area. Additionally, the size of the space used for the paging area ID (an eight octet space as shown in FIG. 12C) can be varied to accommodate paging area IDs of different lengths. Furthermore, the paging area ID can be included in any of the other packets broadcast by the access points. By including the paging area ID as an element in the beacon of the IEEE 802.11 protocol or other broadcast packet, the paging area ID will be periodically broadcasted by each access point in an access point group every time the beacon or other packet is broadcast throughout the range of each access point, respectively.

In assigning a channel over which to broadcast the beacon or other packet containing the access point ID, there are several issues to consider. It is advantageous for adjacent access points to broadcast the beacon over different channels because this helps avoid interference. It is also advantageous for the access points to broadcast the beacon or other packet over a different channel than that used to broadcast the IP traffic because this helps to avoid interference between the IP traffic and the beacon or other packet. Although the IEEE 802.11 protocol's physical layer defines multiple channels, the more channels that are used the more channels a computing device must search every time a computing device moves from the range of one access point into the range of another. Clearly there is a conflict in the requirements of channel separation and minimizing the number of channels. Therefore, several methods of assigning the channel which will be used to broadcast the beacon are provided so that the assignment can be optimized for a given situation.

Methods of channel assignment include: (1) static assignment; (2) standard common paging channel assignment; and (3) local common paging channel assignment method. In the static assignment method, all the access points in the WLAN are assigned the same common channel over which the IP traffic and the beacon or other packet containing the paging area ID will be broadcast.

In the standard common paging channel assignment method, a single paging channel is assigned to all the access points in the WLAN. The access points are assigned a common channel over which to broadcast the beacon or other packet containing the paging area ID (the "beacon channel") and different common channel over which to broadcast the IP traffic (the "IP channel"). This method can reduce the need for a computing device to search for the beacon channel and can eliminate the risk of interference between the beacon channel and the IP channel. However, there is still a risk of interference among the broadcasts of adjacent access points. Although this method can eliminate the need for a computing device to search for the beacon broadcast, there is a risk of interference between the beacon or other packet and the IP traffic. Additionally, there is a risk of interference among the broadcasts of adjacent access points.

The local common paging channel helps to reduce the risk of interference among the broadcasts of adjacent access points. In the local common paging channel assignment method, all the access points in the same access point group are assigned the same paging channel. However, no adjacent access paging groups are assigned the same paging channel. The IP channel is a channel which is different from any of the paging channels. Generally, the paging channel for each access point group is assigned by that access point group's root access point. Additionally, each slave access point uses the same paging channel as its master and none of the slave access points uses the paging channel as its IP channel. In this approach, the computing device need only search for the paging channel when it crosses a paging area boundary because all the access points in the access point group have the same paging area ID. Additionally, assigning different beacon channels to adjacent access point groups helps to reduce the risk of interference among the beacon channels of these groups.

No matter the method of channel assignment used, in order for a computing device to detect a beacon or other packet, it must be awakened from dormant mode. Once awakened into active mode, the computing device will search for the paging channel if the local common paging channel assignment method was used for the beacon or other packet. Generally, the computing device itself is programmed to periodically awaken at set intervals and remain in active mode for a predetermined time period (the "beacon window"). However, the set intervals and beacon window need to generally correspond with the timing of the beacon broadcast (the "beacon timing") of the access points.

Synchronizing the beacon timing of all the access points within an access point group not only allows the computing device to awaken from dormant mode only periodically, it enhances the battery life of the computing device. Access points need to continuously and periodically broadcast their paging area ID so that the access points can be recognized by a computing device when the computing device crosses a paging area boundary. As noted above, the computing device must periodically awaken from dormant mode to detect the beacon or other packet containing the paging area ID. However, frequent awakening causes heavy battery consumption. To save battery consumption, the number of awakenings needs to be reduced. If the access points in the same access point group all broadcast their beacons or other packets at the same time, the computing device only needs to awaken during the period of time during which the beacon is broadcast, even if the computing device has crossed from within the range of one access point into that of another.

If all the access points in an access point group are in the same subnet of the WLAN, the access points can adjust their beacon timings to coincide with the beacon timings of the other access points using the local subnet broadcast which can be realized by IAPP. However, if some of the access points in an access point group reside in different subnets, transition delays and router queuing delays make the local subnet broadcast an imprecise mechanism for synchronizing the beacon timings. Therefore, if all the access points in an access point group are not in the same subnet, synchronizing the beacon timing of all the access points cannot be accomplished using the distribution system. Instead synchronization is achieved by using the computing device's timing reports. The computing device's timing reports contain at least a beacon timing difference.

Figure 13A:
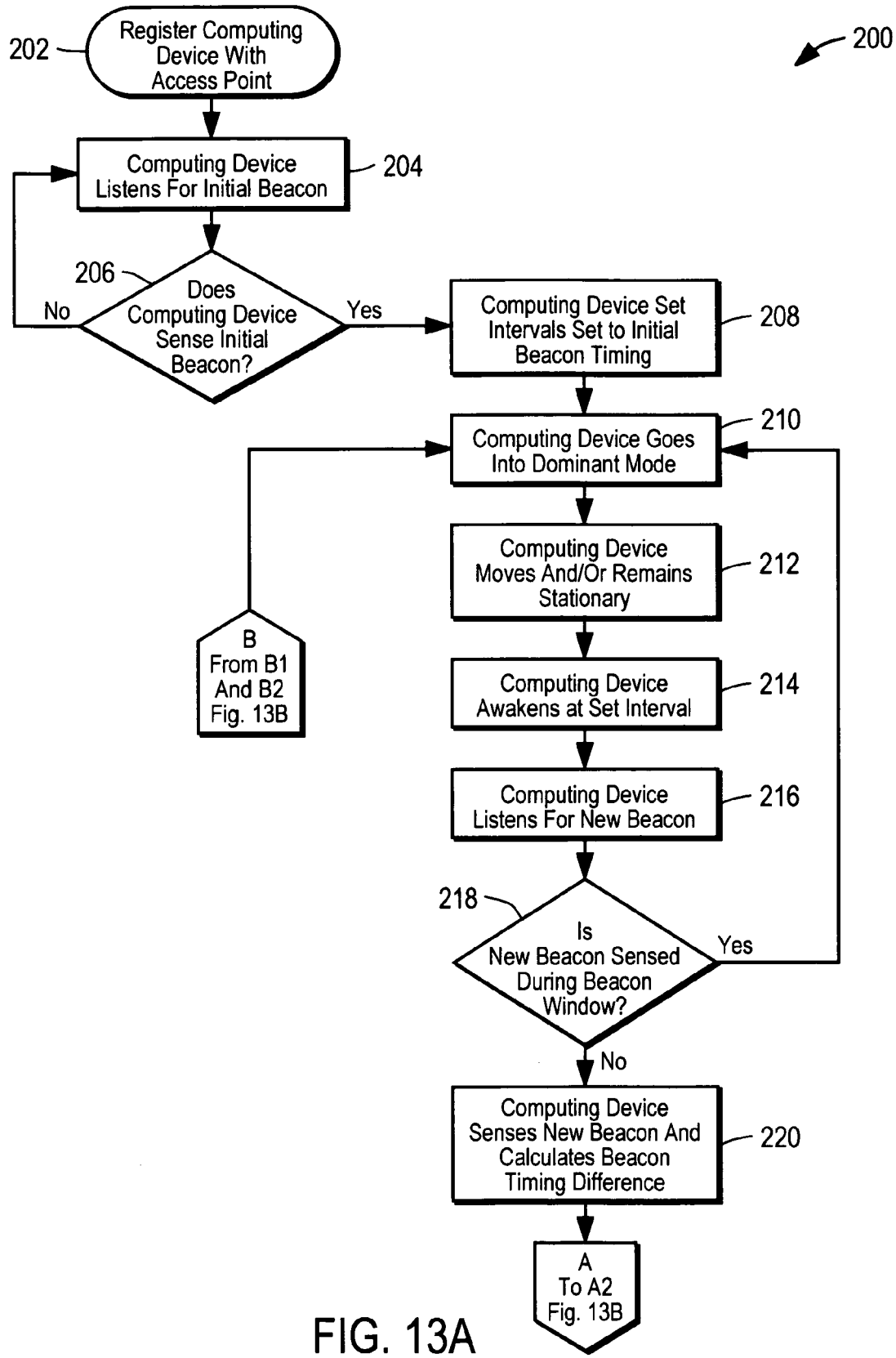
FIG. 13A is a flow chart of a method for beacon synchronization, according to a preferred embodiment.
Figure 13B:
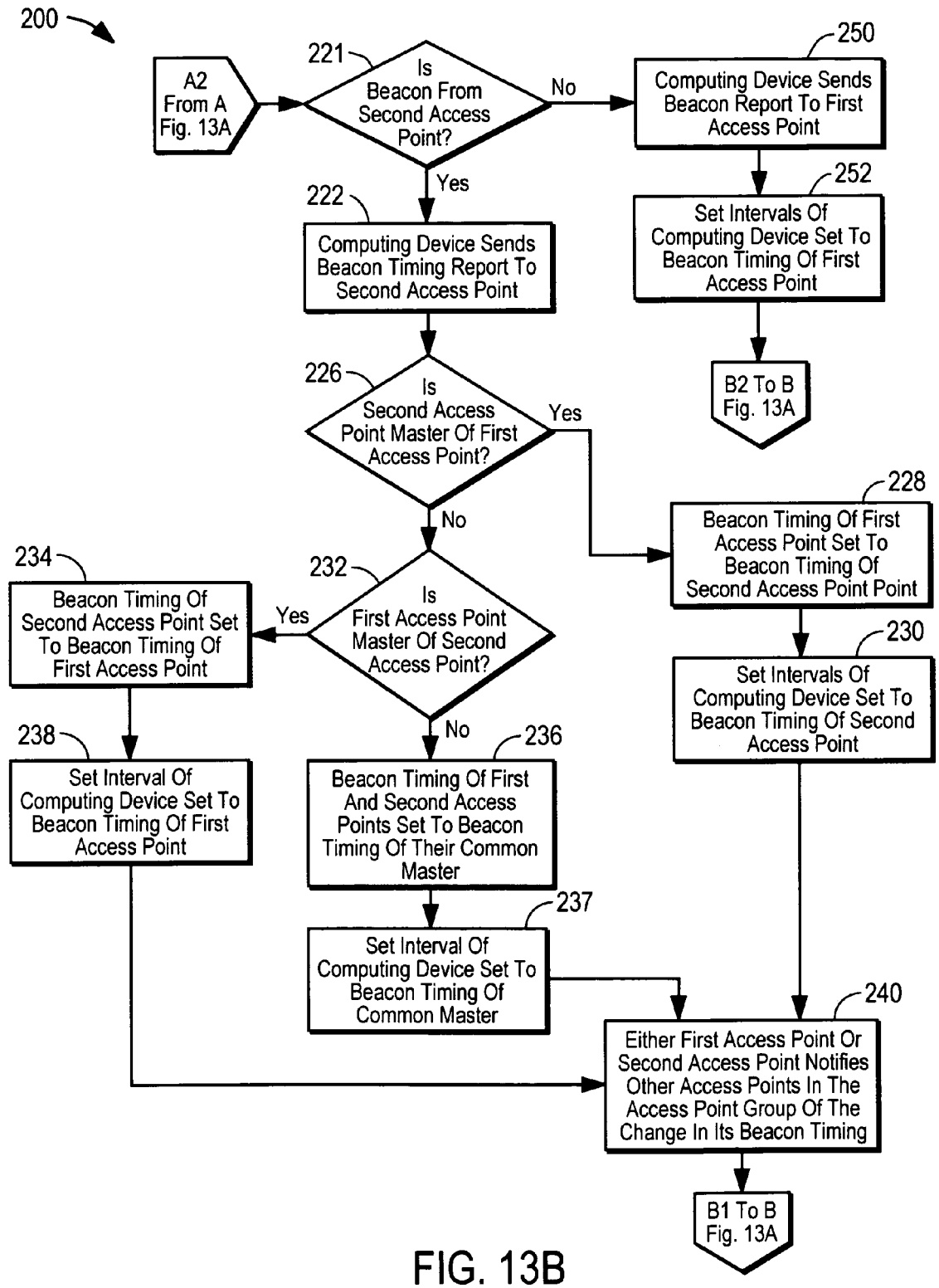
FIG. 13B is a continuation of the flow chart of 15B.

The method used for synchronizing the beacon timings of all the access points in an access point group is shown in FIG. 13A and 13B. Initially, as shown in FIG. 13A, when a computing device enters a paging area ("the first paging area"), the computing device registers with the access point of which it is in range (the "first access point") 202. The computing device then listens for an initial beacon from the first access point 204. As it listens, the computing device determines whether it senses the initial beacon 204. If the computing device does not sense the initial beacon, it continues to listen 204 until it determines that it has sensed the initial beacon 206. The initial beacon (as do all beacons) contains the beacon timing for the access point group of which the first access point is a member. The beacon timing lets the computing device know when to anticipate the next beacon. Upon sensing the initial beacon, the computing device sets its set intervals to the group beacon timing 208 and then goes into dormant mode 210. The computing device will now anticipate beacons according to the group beacon timing.

While in dormant mode, the computing device may remain stationary, move within the range of the first access point, move into the range of another access point within the first paging area (the "second access point") or move into a second paging area 212. If the computing device remains stationary, moves within the range of the first access point or moves into the range of a second access point, it will awaken at its set interval (now set to the group beacon timing) 214 and listen for a new beacon 216. The new beacon will either be the first access point's beacon, or it will be the second access point's beacon if the computing device has moved into the range of the second access point. The computing device then determines whether it senses a new beacon during the beacon window 218. If it determines that it has sensed a beacon during the beacon window, the timing of the new beacon and the set interval of the computing device are already synchronized. Therefore, the computing device returns to dormant mode 210 and steps 210-218 are repeated until the computing device determines that it does not sense a new beacon during its beacon window 218.

If the computing device determines that it has not sensed a new beacon during its beacon window 218, the set intervals and the timing of the new beacon are not synchronized. Therefore, the computing device remains in active mode until it determines that it does sense a new beacon from which it calculates a beacon timing difference 220. The beacon timing difference is the difference in time between the beginning of the beacon window during which a new beacon was anticipated by the computing device and the time when the new beacon is actually sensed by the computing device. If the new beacon did not come from the second access point 221, it came from the first access point. This means that the computing device has stayed within range of the first access point and the set interval of the computing device is not synchronized with the beacon timing of the first access point. Therefore, the computing device sends a beacon timing report containing at least the beacon timing difference to the first access point 250. The computing device then sets its timer to the beacon timing of the first access point 252 and the computing device returns to dormant mode 210 and the process continues from step 210.

If the new beacon is from the second access point 221, this means that the computing device has moved into the range of the second access point. The computing device sends the beacon timing report including at least the beacon timing difference and an identification of the first access point to the second access point 222. Then it is determined if the second access point is the master of the first access point 226. The second access point makes this determination from the identification of the first access point in the beacon timing report. If the second access point is the master of the first access point, the beacon timing of the first access point is set to that of the second access point 228. The set intervals of the computing device are also set to the beacon timing of the second access point 230. If, however, the second access point is not the master of the first access point 226, it must be determined whether the first access point is the master of the second access point 232. If the first access point is the master of the second access point, the beacon timing of the second access point is set to that of the first access point 234. Then the set intervals of the computing device are set to the beacon timing of the first access point 238. In contrast, if the first access point is not the master of the second access point, the beacon timings of the first and second access points are set to that of their common master 236. The set interval of the computing device is then also set to the beacon timing of the common master 237. After the set interval of the computing device is set in any of steps 230, 237 or 238, whichever access point had changed its beacon timing (the first access point, the second access point or both) notifies the other access points in the access point group of the change in their beacon timing. However, if the first and second access points are in different paging areas, as indicated by the paging area ID included in the beacon, the computing device will not synchronize the first and second access points.

Figure 14:
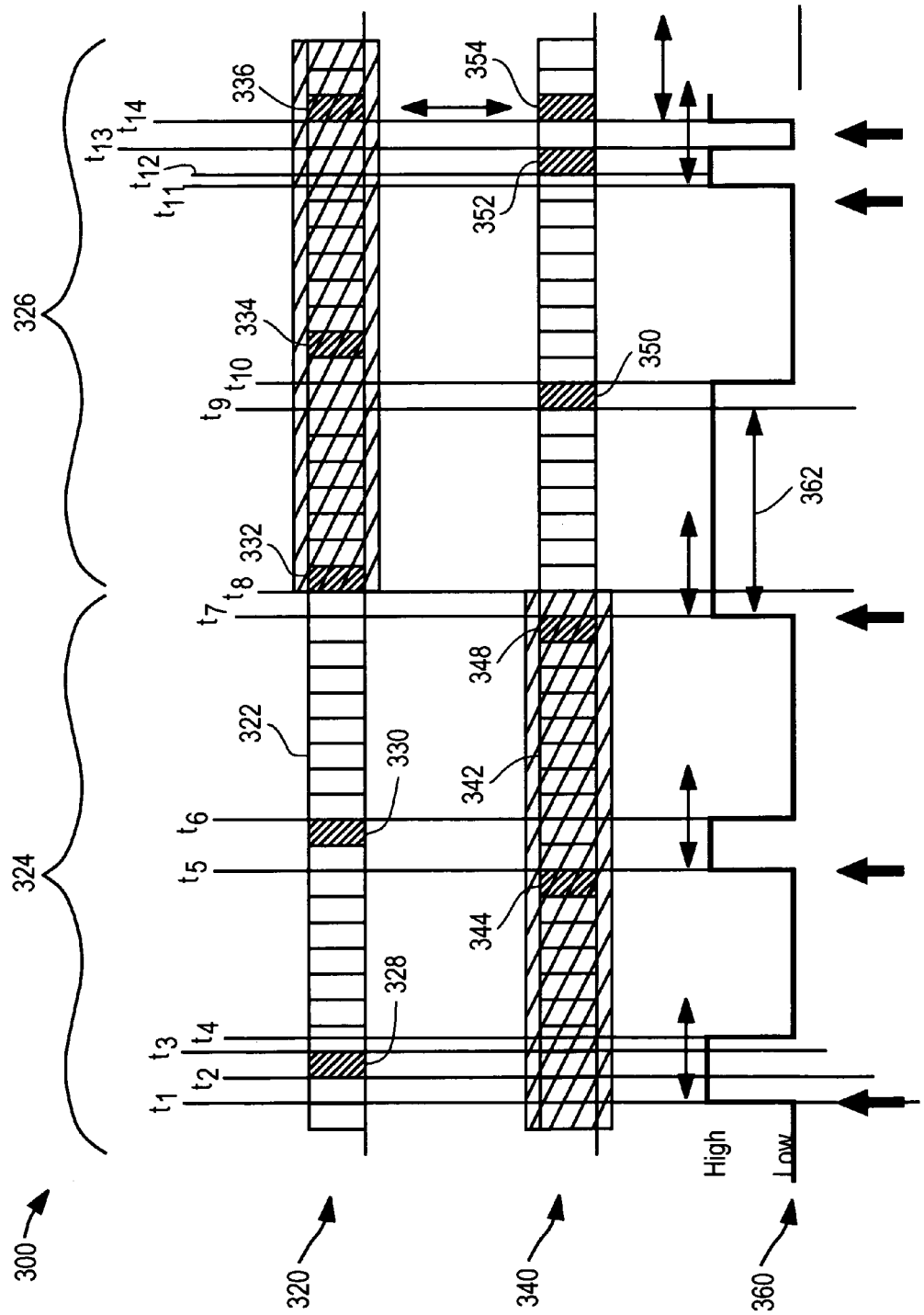
FIG. 14 is a diagram of the signals produced by a first access point, a second access point and a computing device during beacon synchronization, according to a preferred embodiment.

An example of the signaling activity involved in beacon synchronization is shown in FIG. 14. In this example, a computing device moves from within the rage of a first access point to within the range of a second access point at a time t8 wherein the beacon timings of the two access points are not synchronized. Additionally, both access points are located in the same access point group and the first access point is the master of the second access point. The signal for the computing device 360 is indicated as "low" when the computing device is in dormant mode and is indicated as "high" when the computing device is in active mode. The signals of the first access point 320 and the second access point 322 are divided into a plurality of segments. Each segment 322 and 342, respectively, has the duration of approximately the duration of the beacon of each access point, respectively. The computing device is within the range of the first access point during a first time period 324 and moves within the range of the second access point at a time t8 and remains there during a second time period 326. Although the second access point is broadcasting its beacon 344 and 348 during the first time period 324, the computing device does not sense these beacons 344 and 348 because the computing device is not within the range of the second computing device during the first time period 324. Subsequently, the computing device moves into the range of the second access point at time t8, is within the range of the second access point during a second time period 326 and remains there during a second time period 326. Although the first access point is broadcasting its beacon 332, 334 and 336 during the second time period 326, the computing device does not sense these beacons 332, 334 and 336 because the computing device is not within the range of the first computing device during the second time period 326.

Initially when the computing device is within the range of the first access point during the first time period 324, the computing device's signal is "high" at time t1. The first access point broadcasts its beacon 328 between time t2 and t3. After the first access point's beacon 328 has been broadcast, the computing device returns to dormant mode at time t4 (the signal of the computing device becomes "low"). Because the first access point's beacon 328 contains the beacon timing, the computing device knows when to anticipate the first access point's next beacon. Therefore, at time t5, a short time before the first access point's beacon 330 is anticipated, the computing device's signal goes "high" and remain "high" until the first access point has completed broadcasting the first access point's beacon 332.

At time t8, the beginning of the second time period 326, the computing device moves from within the range of the first access point to within the range of the second access point. However, just prior to its move at time t7, the computing device had anticipated the next beacon 332 from the first access point. If the beacon timings of the first and second access points were synchronized, the computing device should sense the second access points beacon shortly after time t7. Because the beacon timings of the first and second access points are not synchronized, the computing device does not sense the second access point's beacon at time t8 but instead at time t9. Therefore, the signal of the computing device must remain "high" until time t10 when the second access point has completed the broadcast of its beacon 350.

In order to synchronize the beacon timings of the first access point and the second access point, the computing device calculates the beacon timing difference 362. In this case, the beacon timing difference 362 is the difference between time t10 (when the broadcast of the second access point's beacon 350 is complete) and time t7 (shortly before the broadcast of the first access point's beacon 332 was anticipated). The computing device then sends the beacon timing difference to the second access point. The second access point identifies the first access point using IAPP and the Service Location Protocol ("SLP"). Because the first access point is the master of the second access point, the second access point must adjust its beacon timing to that of the first access point.

Because at this point the last beacon sensed by the computing device is the second access point's beacon 350 and beacon 350 contains the unsynchronized beacon timing of the second access point, the signal of the computing device will go "high" at time t11 just before the computing device anticipates the next beacon at time t12. Therefore, before adjusting its beacon timing to that of the first access point, the second access point broadcasts one more beacon 352 according to its original beacon timing at t12. However, beacon 352 contains a beacon timing adjusted to that of the first access point. The computing device's signal will go "low" at time t13 after the broadcast of beacon 352 is complete. The computing device's signal will go "high" again at t14 just before the second access point's next beacon 354 is anticipated according to the adjusted beacon timing.

The step of locating a computing device includes associating the computing device whenever it crosses an access point boundary and whenever it is paged. Whenever a computing device crosses an access point boundary, it must associate with a new access point group. In order to associate with a new access point group, the computing device will communicate with an access point in the access point group of which the computing device is in range (the "in-range access point"). More specifically, to associate with a new access point group, the computing device sends a request to associate to the in-range access point. The root access point of the new access point group, which may be the in-range access point, then assigns an association identification ("AID") to the computing device and adds the AID and the associated MAC address of the computing device to its association table. The AID will typically have a value of in the range of about 1 to about 2007 and is placed in the 14 least significant bits of the AID field with the two least significant bits of the AID filed each set to "1." The root access point of the new access point group will then communicate the MAC address and AID of the computing device to the other access points in the new access point group. This communication occurs during association and thru the use of IAPP to broadcast the IAPP-ADD.request (which includes the MAC address and AID of the computing device) over the local subnet broadcast using IAPP to all the access points on the same subnet. This communicates the MAC address of the computing device to the access points on the same subnet as the root access point. For access points in the access point group that are not on the same subnet as the root access point, IAPP may also be used to communicate the MAC address of the computing device. Because the MAC address is used to identify the computing device instead of the IP address, the problems normally associated with a computing device moving from one subnet to the other are avoided.

The AID will remain associated with the computing device and the MAC number of the computing device will remain in the association tables of the access points of the new access point group until the computing device explicitly or implicitly disassociates from the new access point group. To disassociate explicitly, the computing device invokes a disassociation service. To disassociate implicitly the computing device simply leaves the range of the new access point group without explicitly disassociating. The new access point group will discover that the computing device has left its range without explicitly disassociating when the new access point group does not receive a communication from the computing device within a predetermined time period. At this time, the computing device will be disassociated. When the computing device disassociates from the access point group, the AID is available to be reused and the computing device's MAC address is deleted from the association tables of the access points in the new access point group.

In addition to associating with an access point group, the computing device must also associate with an access point when it is paged so that it can receive IP traffic. Once a computing device has associated with an access point group, that access point group may then receive IP traffic for that computing device through the root access point. When the root access point receives IP traffic for the computing device, the computing device must then be located within the access point group and, if in dormant mode, the computing device must be moved into active mode. Because the location of the computing device within the access point group is unknown, the root access point communicates to the other access points in the access point group that the communication device needs to be paged. All the access points in the access point group then page the communication device. After receiving the page, the communication device then sends a request to associate to whichever of the access points the computing device is in range. That access point then notifies the root access point of the presence of the computing device within its range and the root access point then forwards the IP traffic to that access point. That access point then forwards the IP traffic to the computing device. While the computing device is in active mode, if it moves into the range of a second access point in the same access point group, it will register with the second access point.

Although the methods and apparatuses disclosed herein have been described in terms of specific embodiments and applications, persons skilled in the art can, in light of this disclosure, generate additional embodiments without exceeding the scope or departing from the spirit of the claimed inventions. For example, the methods and apparatuses disclosed herein can be implemented in any protocol that supports dormant mode and paging functionalities. Accordingly, it is to be understood that the drawings and descriptions in this disclosure are proffered to facilitate comprehension of the invention and should not be construed to limit the scope thereof.

We claim:

1. A method of communicating access point group information to a computing device in a wireless local area network (WLAN), comprising:
    each of at least two access point groups broadcasting beacons on an assigned channel over the WLAN for that access point group within a paging area defined by that access point group, wherein the beacons broadcast by each access point group include a common paging area identifier unique to that access point group, and further wherein at least one access point group includes at least a first access point and a second access point;
    periodically awakening the computing device to detect the beacons of the first access point and the second access point; and
    aligning a first beacon timing of the first access point with a second beacon timing of the second access point to cause the first beacon timing and the second beacon timing to be received by the computing device at substantially a same time.

2. A wireless local area network (WLAN) communication system, comprising:
    a plurality of groups of access points in the WLAN, wherein each group of access points comprises one or more access points with at least one group of access points having at least a first access point and a second access point, ranges for the one or more access points in each of the plurality of groups define a paging area for said each group; and
    the first access point and the second access point to broadcast, in the paging area for the at least one group, beacons that include a common paging area identifier unique to the at least one group, wherein a first beacon timing of the first access point is adjusted to align with a second beacon timing of the second access point to cause the first beacon timing and the second beacon timing to be received by a computing device using the WLAN at substantially a same time.

3. The communication system as claimed in claim 2, wherein the unique paging area identifier comprises a unique paging area identification number.

4. The communication system as claimed in claim 3, wherein the unique paging area identification number is included in a beacon packet broadcast by the one or more access points in its corresponding group of access points.

5. The communication system as claimed in claim 2, wherein one access point in the at least one group of access points having at least two access points is a master and one or more other access points in the at least one group of access points are slaves, and each access point that is a slave is coupled to exactly one access point that is the master.

6. The communication system as claimed in claim 5, wherein access points communicate using IEEE Inter Access Point Protocol.

7. The communication system as claimed in claim 6, wherein the IEEE Inter Access Point Protocol comprises a join operation, a leave operation, a group merge operation, a group prune operation and a group devolution operation.

8. The communication system as claimed in claim 2 further comprising a single channel for paging and IP traffic.

9. The communication system as claimed in claim 2 further comprising a channel for paging and a channel for IP traffic.

10. The communication system as claimed in claim 2 further comprising a channel for IP traffic and a common dedicated channel for paging for each of the plurality of access point groups.

11. The communication system as claimed in claim 10, wherein each of the plurality of access point groups has a root access point that assigns the common dedicated channel for paging.

12. The communication system as claimed in claim 2 further comprising a computing device.

13. The communication system as claimed in claim 12, wherein each of the plurality of access points broadcasts a beacon, wherein the beacon includes a beacon timing for that access point, and further wherein a difference between the beacon timing for a first access point and the beacon timing for a second access point define a beacon timing difference; and
    wherein the computing device and at least a subset of the plurality of access points use the beacon timing difference to synchronize the beacon timings of the plurality of access points.

14. The communication system defined in claim 2 further comprising a mobile unit operable in a power savings mode, wherein at least one access point uses paging when the mobile unit is in the power savings mode and is in the paging area associated with the at least one access point to notify the mobile unit that a message has been received for the mobile unit.

15. The communication system defined in claim 14 wherein the at least one mobile unit buffers the message until the mobile unit exits the power savings mode and receives the message.

16. The communication system defined in claim 2 wherein at least one of the first access point or the second access point sends a beacon on a dedicated channel, the beacon containing the common paging area identifier identifying the group of access points to which the at least one access point belongs.

17. The method of claim 2, the first access point serves as a slave access point and the second access point serves as a master access point.

* * * * *